United States Patent
Yin et al.

(10) Patent No.: US 9,463,717 B2
(45) Date of Patent: *Oct. 11, 2016

(54) ROTATABLE VEHICLE SEAT FRAME ASSEMBLY

(71) Applicant: Wan-Yu Li, Taipei (TW)

(72) Inventors: Qing-Kun Yin, Guangdong (CN); Chin-Chen Chang, Taipei (TW)

(73) Assignee: Wan-Yu Li, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/499,135

(22) Filed: Sep. 27, 2014

(65) Prior Publication Data

US 2015/0375640 A1 Dec. 31, 2015

(30) Foreign Application Priority Data

Jun. 26, 2014 (CN) .......................... 2014 1 0288699

(51) Int. Cl.

| A47B 39/00 | (2006.01) |
|---|---|
| B60N 2/20 | (2006.01) |
| B60N 3/00 | (2006.01) |
| B60N 3/06 | (2006.01) |
| B60N 2/07 | (2006.01) |
| B60N 2/22 | (2006.01) |
| B60N 2/44 | (2006.01) |
| B60N 2/48 | (2006.01) |
| B60N 2/46 | (2006.01) |

(52) U.S. Cl.
CPC ............. *B60N 2/206* (2013.01); *B60N 2/0722* (2013.01); *B60N 2/22* (2013.01); *B60N 2/4495* (2013.01); *B60N 2/4633* (2013.01); *B60N 2/4838* (2013.01); *B60N 3/001* (2013.01); *B60N 3/063* (2013.01)

(58) Field of Classification Search
CPC ...... B60N 2/34; B60N 2/206; B60N 2/0722; B61D 37/00
USPC ..... 297/135, 63, 67, 118, 157.1, 174 R, 119, 297/147, 154; 5/2.1, 3, 12.1; 108/143, 42
See application file for complete search history.

(56) References Cited

U.S. PATENT DOCUMENTS 3,880,458 A * 4/1975 Jackson .................... B60P 3/32
296/164
5,031,563 A * 7/1991 Matre ................ B62D 33/0612
105/318

(Continued)

FOREIGN PATENT DOCUMENTS

| JP | 03061130 A | * 3/1991 |
|---|---|---|
| JP | 2013154772 A | 8/2013 |

OTHER PUBLICATIONS

English Abstract of JP2013154772A.

*Primary Examiner* — Laurie K Cranmer
(74) *Attorney, Agent, or Firm* — Tracy M. Helms; Apex Juris, pllc

(57) ABSTRACT

A rotatable vehicle seat frame assembly has a main frame, at least one first seat frame, at least one second seat frame, and at least one elevatable desk. Each seat frame has a bottom sliding mechanism, a top sliding mechanism, and an angle-adjusting mechanism. The second seat frame further has a leg rest assembly. The bottom sliding mechanisms, the top sliding mechanisms, the angle-adjusting mechanisms, and the leg rest assembly enable the seat frame to be rotated into a flattened status in a limited inner space of a vehicle, enable the seat frame to be transformed between a passenger-mode and a cargo-mode, and enable the seat frame to be used as a bed during a long trip. When in the passenger-mode, the position of the seat bracket and the angle of the back support bracket may be adjusted to facilitate convenience, and to provide more use modes in a limited inner space with the elevatable desk.

15 Claims, 28 Drawing Sheets

(56) References Cited

U.S. PATENT DOCUMENTS

| | | | | |
|---|---|---|---|---|
| 5,947,416 A * | 9/1999 | Kraft | ............ | A47B 1/00 108/143 |
| 6,209,956 B1 * | 4/2001 | Dryburgh | ............ | A47C 1/0352 244/118.6 |
| 7,399,031 B2 * | 7/2008 | Gardner | ............ | B60P 3/39 297/1 |
| 9,174,556 B2 * | 11/2015 | Yin | ............ | B60N 2/34 |
| 2014/0237717 A1 * | 8/2014 | Wong | ............ | A47C 17/165 5/2.1 |

* cited by examiner

ROTATABLE VEHICLE SEAT FRAME ASSEMBLY

CROSS-REFERENCE TO RELATED APPLICATIONS

This application is based upon and claims priority under 35 U.S.C. 119 from China Patent Application No. 201410288699.6 filed on Jun. 26, 2014, which is hereby specifically incorporated herein by this reference thereto.

BACKGROUND OF THE INVENTION

1. Field of the Invention

The present invention relates to a rotatable vehicle seat frame assembly, especially to a rotatable vehicle seat frame assembly that can be installed in the vehicle for users to be seated on.

2. Description of the Prior Arts

Vehicles generally include the following two types: the type designed for passengers and the type designed for cargo. Vehicles designed for passengers often have fixed vehicle seats in the back seat area for passengers, and have a relatively narrower accommodating space behind the fixed vehicle seats, which is for accommodating goods in small quantity or volume. Vehicles designed for cargo have no back seats in the back seat area and have a relatively larger accommodating space instead for accommodating goods in large quantity or volume.

However, users may need one vehicle with different functions for different situations. For example, the user may need a vehicle designed for cargo when working, but also need a vehicle designed for passengers when going out with family or friends. If the user takes passengers on a vehicle designed for cargo, it is dangerous and uncomfortable for the passengers as the vehicle has no fixed passenger seats to sit on. If the user loads cargo on a vehicle designed for passengers, the vehicle cannot accommodate goods in large quantity or volume as the fixed vehicle seats occupy most central parts of the back seat area. As a result, for those who have both needs as mentioned above, the conventional vehicles are quite inconvenient. Besides, passengers may need to lie semi-reclined or fully lie down in the vehicle during a medium or long trip, but it is hard for the conventional vehicle to provide this function since the inner space of the vehicle is limited.

To overcome the shortcomings, the present invention provides a rotatable vehicle seat frame assembly to mitigate or obviate the aforementioned problems.

SUMMARY OF THE INVENTION

The main objective of the present invention is to provide a rotatable vehicle seat frame assembly that has multiple seat frames, which can be transformed between a passenger-mode and a cargo-mode to facilitate convenience and applicability.

The rotatable vehicle seat frame assembly has a main frame, at least one first seat frame, at least one second seat frame, and at least one elevatable desk. The at least one first seat frame is mounted on a top surface of the main frame, and each one of the at least one first seat frame has a first stand assembly, a first seat assembly, and a first back support assembly. The first stand assembly has a first base bracket, a first stand and a first bottom sliding mechanism. The first stand is slidably mounted on a top surface of the first base bracket. The first bottom sliding mechanism is mounted between the first stand and the first base bracket to make the first stand slidable relative to the first base bracket. The first seat assembly is slidably mounted on a top surface of the first stand assembly, and has a first seat bracket and a first top sliding mechanism. The first top sliding mechanism is mounted between the first seat bracket and the first stand to make the first seat bracket slidable relative to the first stand. The first back support assembly is pivotally connected to the first seat assembly, and has a first back support bracket and at least one first angle-adjusting mechanism. The at least one first angle-adjusting mechanism is mounted between the first back support bracket and the first seat bracket to make the first back support bracket rotatable relative to the first seat bracket. The at least one second seat frame is mounted on the top surface of the main frame, and each one of the at least one second seat frame has a second stand assembly, a second seat assembly, a second back support assembly, and a leg rest assembly. The second stand assembly has a second base bracket, a second stand and a second bottom sliding mechanism. The second stand is slidably mounted on a top surface of the second base bracket. The second bottom sliding mechanism is mounted between the second stand and the second base bracket to make the second stand slidable relative to the second base bracket. The second seat assembly is slidably mounted on a top surface of the second stand assembly, and has a second seat bracket and a second top sliding mechanism. The second top sliding mechanism is mounted between the second seat bracket and the second stand to make the second seat bracket slidable relative to the second stand. The second back support assembly is pivotally connected to the second seat assembly, and has a second back support bracket and at least one second angle-adjusting mechanism. The at least one second angle-adjusting mechanism is mounted between the second back support bracket and the second seat bracket to make the second back support bracket rotatable relative to the second seat bracket. The leg rest assembly is pivotally connected to a front side of the second seat bracket, and has a first leg rest, a second leg rest and a rotating assembly. The first leg rest is pivotally connected to the front side of the second seat bracket. The second leg rest is pivotally connected to a front side of the first leg rest. The rotating assembly is mounted between the first leg rest and the second leg rest to make the second leg rest rotatable relative to the first leg rest. The at least one elevatable desk is retractably mounted in the main frame.

The bottom sliding mechanisms, the top sliding mechanisms, the angle-adjusting mechanisms, and the leg rest assembly enable the seat frame to be rotated into a flattened status in a limited inner space of a vehicle, enable the seat frame to be transformed between a passenger-mode and a cargo-mode, and enable the seat frame to be used as a bed during a long trip. When in the passenger-mode, the position of the seat bracket and the angle of the back support bracket may be adjusted to facilitate convenience, and to provide more use modes in a limited inner space with the elevatable desk.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
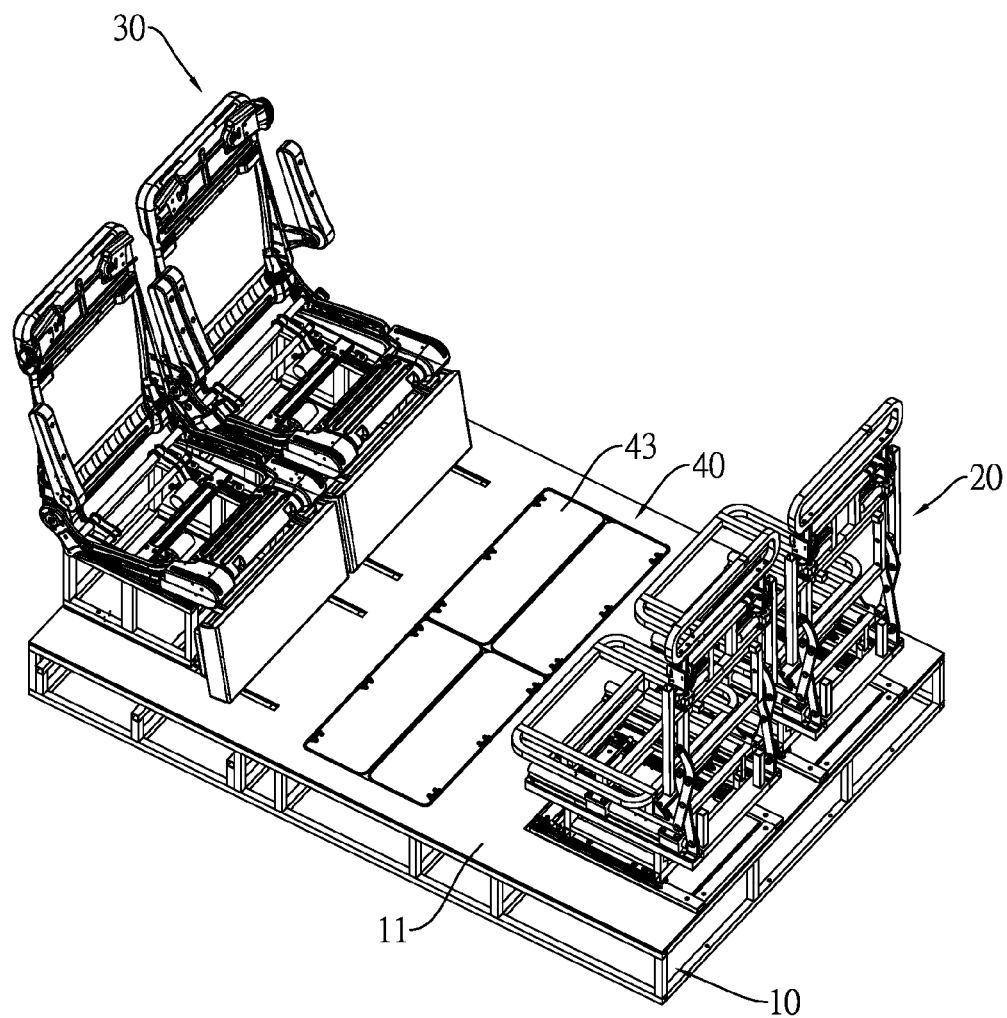
FIG. 1 is a perspective view of a rotatable vehicle seat frame assembly in accordance with the present invention.

With reference to FIG. 1, a rotatable vehicle seat frame assembly in accordance with the present invention comprises a main frame 10, at least one first seat frame 20, at least one second seat frame 30, and at least one elevatable desk 40.

Figure 2:
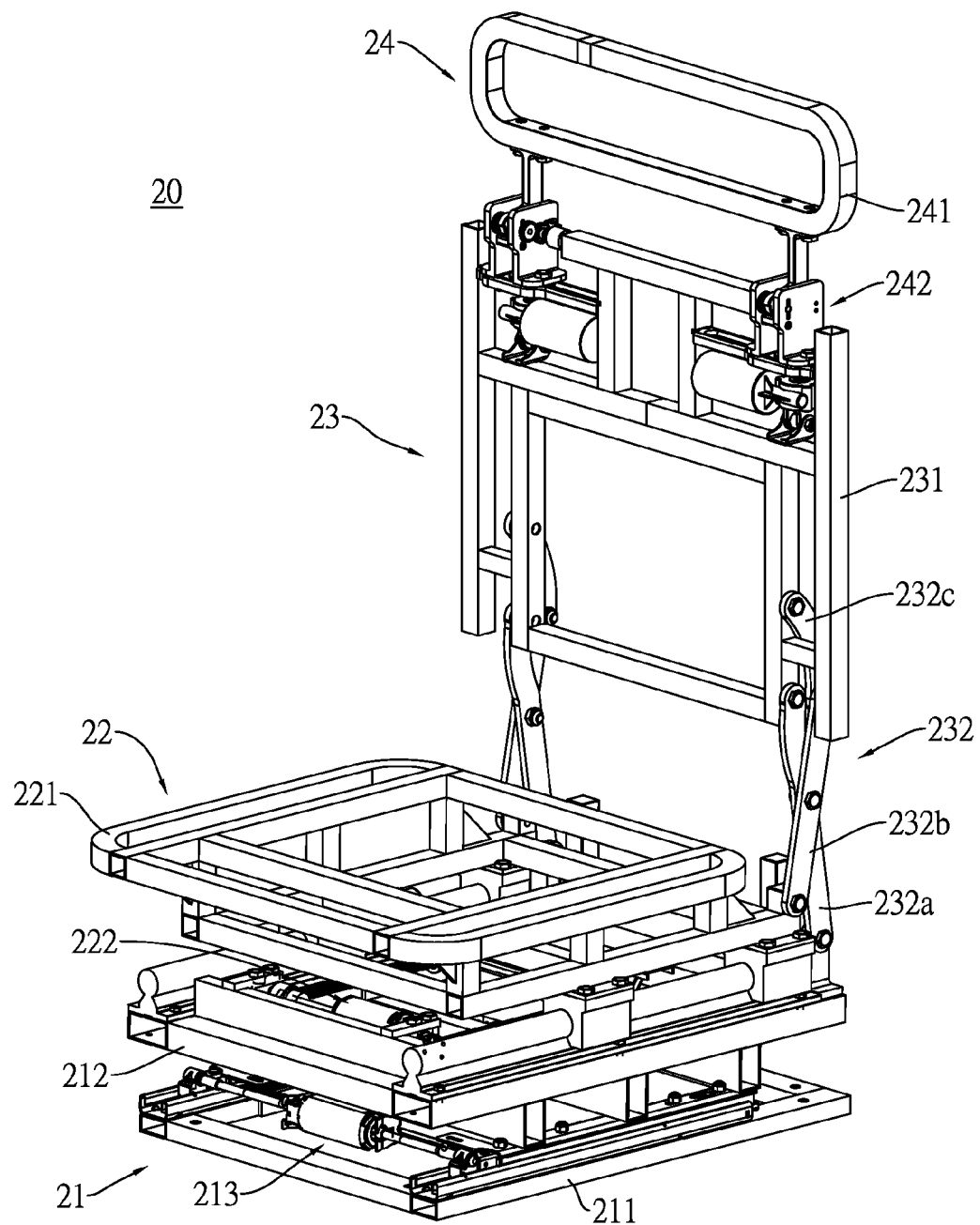
FIG. 2 is a perspective view of a first seat frame of the rotatable vehicle seat frame assembly in FIG. 1.
Figure 3:
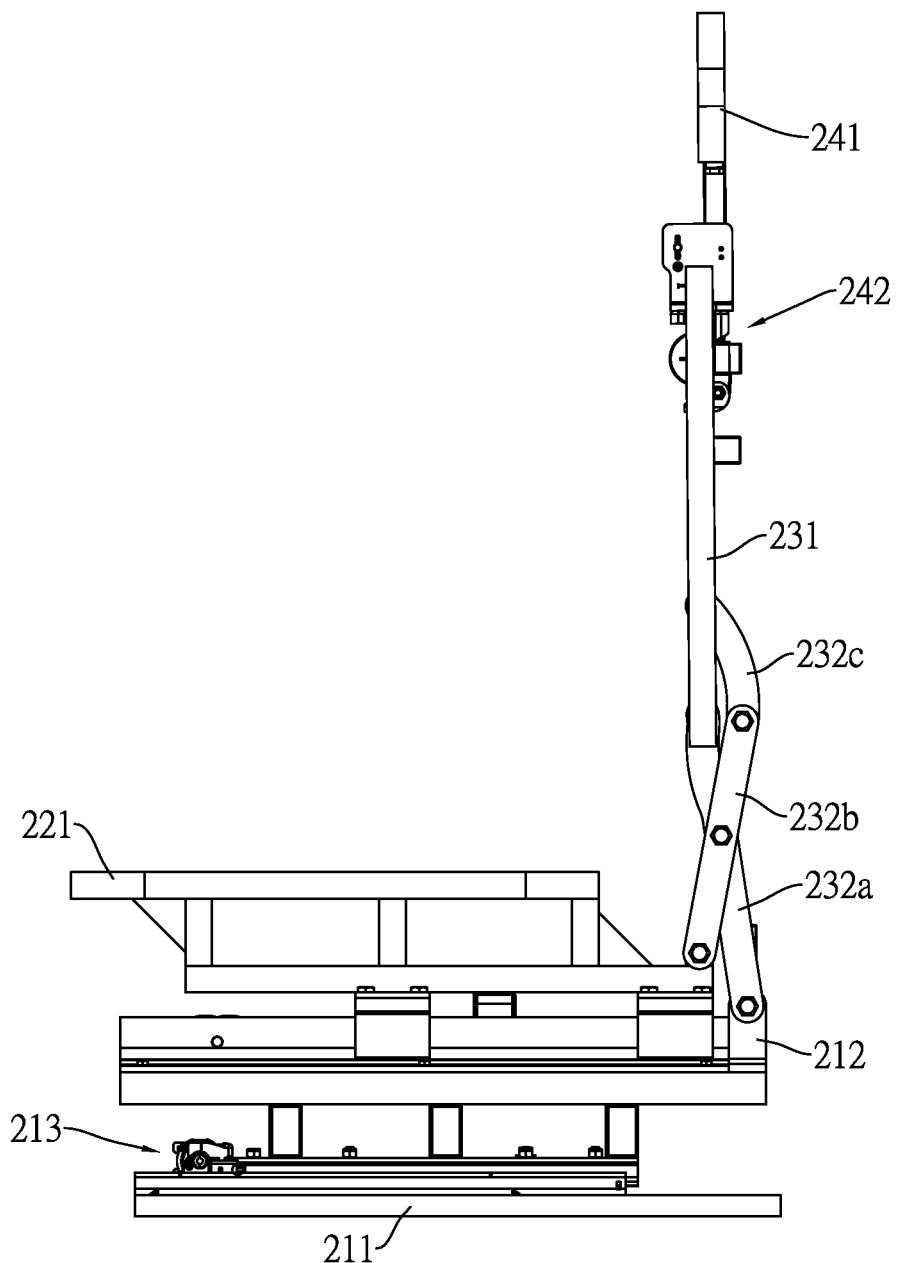
FIG. 3 is a side view of the first seat frame of the rotatable vehicle seat frame assembly in FIG. 1.
Figure 4:
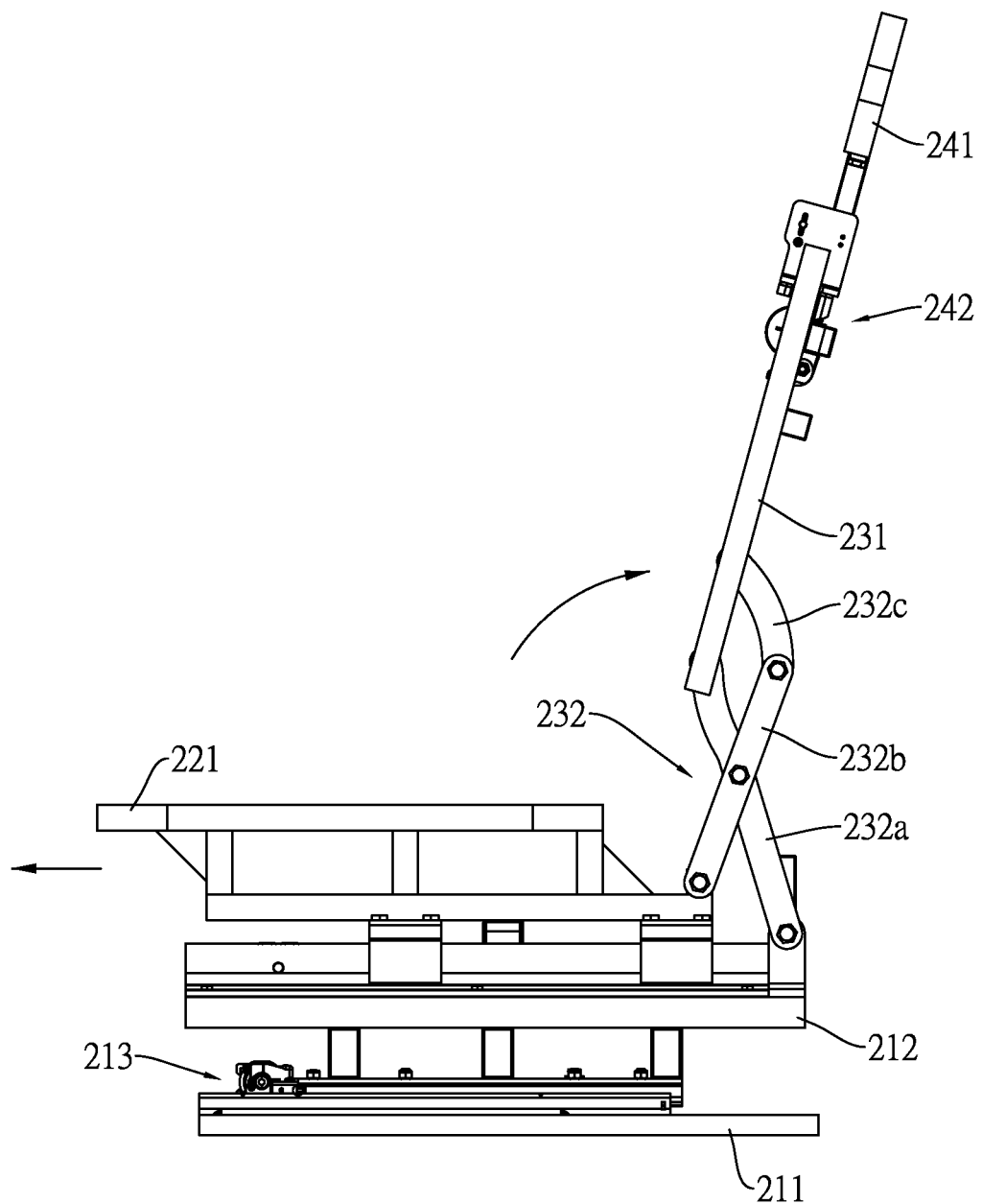
FIG. 4 is an operational side view of the first seat frame of the rotatable vehicle seat frame assembly in FIG. 1.
Figure 5:
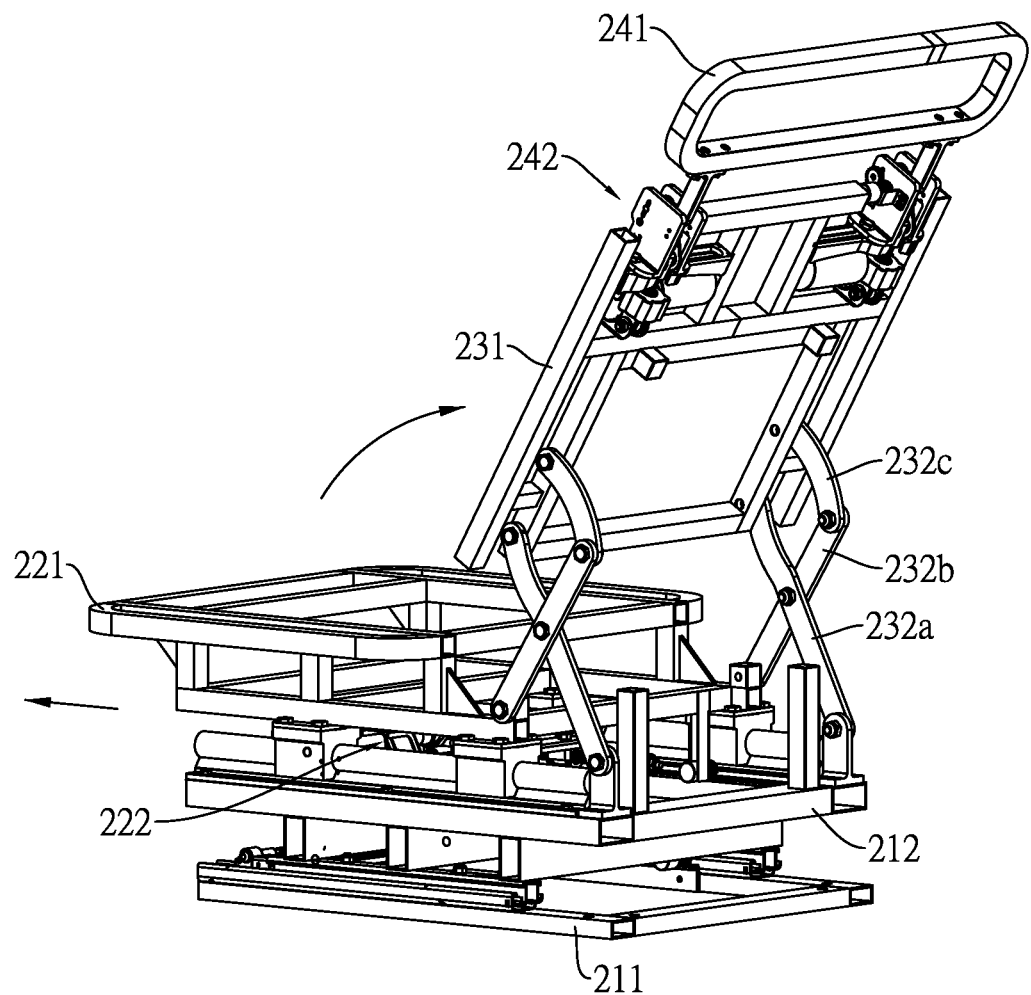
FIG. 5 is an operational perspective view of the first seat frame of the rotatable vehicle seat frame assembly in FIG. 1.
Figure 6:
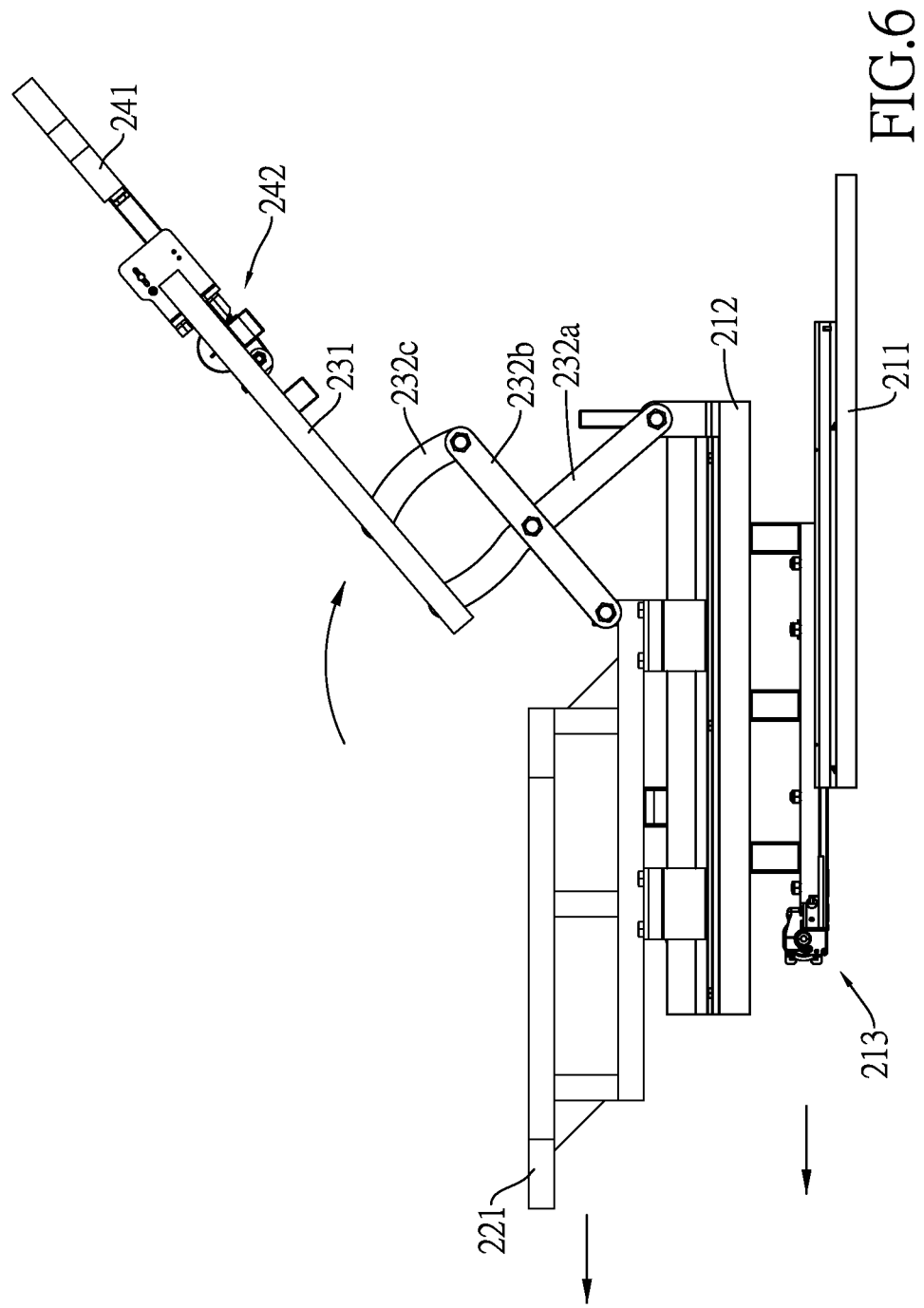
FIG. 6 is another operational side view of the first seat frame of the rotatable vehicle seat frame assembly in FIG. 1.
Figure 7:
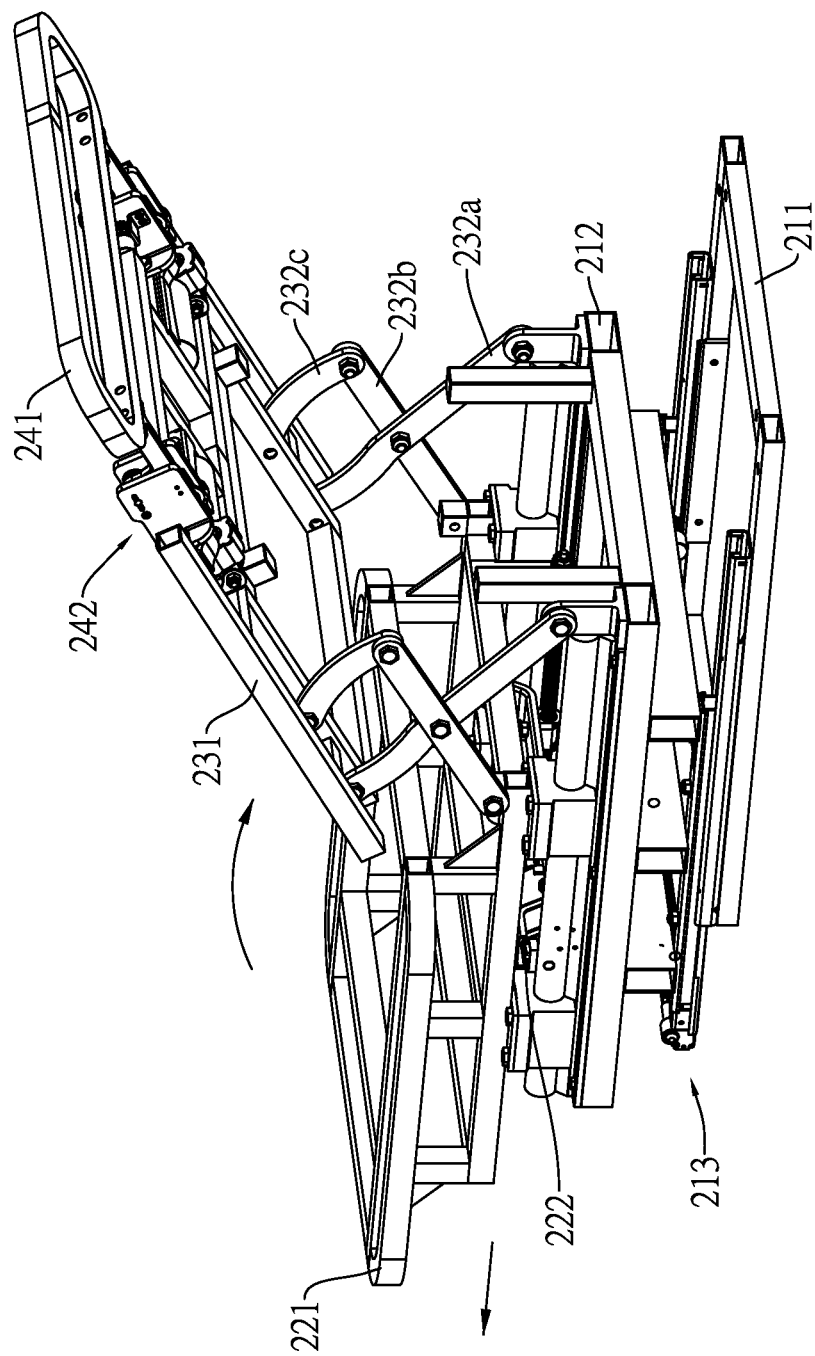
FIG. 7 is another operational perspective view of the first seat frame of the rotatable vehicle seat frame assembly in FIG. 1.
Figure 8:
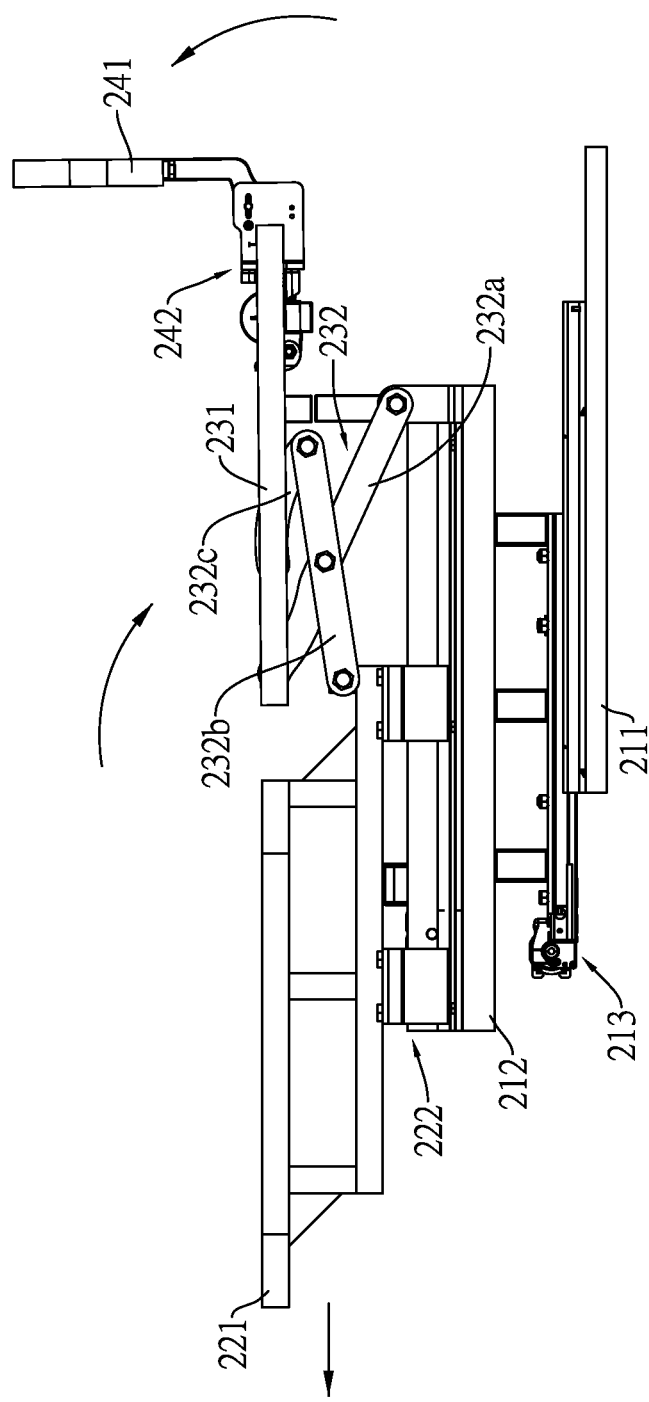
FIG. 8 is still another operational side view of the first seat frame of the rotatable vehicle seat frame assembly in FIG. 1.

With reference to FIGS. 1 to 3, the at least one first seat frame 20 is mounted on a top surface 11 of the main frame 10. Each first seat frame 20 has a first stand assembly 21, a first seat assembly 22, a first back support assembly 23 and a first headrest assembly 24.

The first stand assembly 21 has a first base bracket 211, a first stand 212 and a first bottom sliding mechanism 213. The first stand 212 is slidably mounted on a top surface of the first base bracket 211. The first bottom sliding mechanism 213 is mounted between the first stand 212 and the first base bracket 211 to make the first stand 212 slidable relative to the first base bracket 211. In a preferred embodiment, the first bottom sliding mechanism 213 comprises a motor, a gear assembly, a threaded rod, a nut, and multiple channels.

The first seat assembly 22 is slidably mounted on a top surface of the first stand assembly 21, and has a first seat bracket 221 and a first top sliding mechanism 222. The first top sliding mechanism 222 is mounted between the first seat bracket 221 and the first stand 212 to make the first seat bracket 221 slidable relative to the first stand 212. In a preferred embodiment, the first top sliding mechanism 222 comprises a motor, a gear assembly, a threaded rod, a nut, and multiple channels.

The first back support assembly 23 is pivotally connected to the first seat assembly 22, and has a first back support bracket 231 and at least one first angle-adjusting mechanism 232. The at least one first angle-adjusting mechanism 232 is mounted between the first back support bracket 231 and the first seat bracket 221 to make the first back support bracket 231 rotatable relative to the first seat bracket 221, and to enable the first back support bracket 231 to be rotated into a flattened status. In a preferred embodiment, each one of the at least one first angle-adjusting mechanism 232 has a first rod 232a, a second rod 232b and a third rod 232c. The first rod 232a, the second rod 232b and the third rod 232c each have a first end and a second end. The first end of the first rod 232a is pivotally connected to the first stand 212. The second end of the first rod 232a is pivotally connected to the first back support bracket 231. The first end of the second rod 232b is pivotally connected to the first seat bracket 221. A center segment of the second rod 232b is pivotally connected to a center segment of the first rod 232a. The first end of the third rod 232c is pivotally connected to the second end of the second rod 232b. The second end of the third rod 232c is pivotally connected to the first back support bracket 231.

The first headrest assembly 24 is pivotally connected to the first back support assembly 23, and has a first headrest bracket 241 and at least one first sliding eccentric rod mechanism 242. The at least one first sliding eccentric rod mechanism 242 is mounted between the first headrest bracket 241 and the first back support bracket 231 to make the first headrest bracket 241 rotatable relative to the first back support bracket 231. In a preferred embodiment, each first sliding eccentric rod mechanism 242 comprises a motor, a gear assembly, a threaded rod, a nut, and multiple channels.

With reference to FIGS. 4 to 8, a user may simply operate the first bottom sliding mechanism 213, the first top sliding mechanism 222, the first angle-adjusting mechanism 232 or the first sliding eccentric rod mechanism 242, depending on usage demand to adjust the first seat frame 20 to a desired angle and position. When the first seat frame 20 is rotated into the flattened status, the first top sliding mechanism 222 is switched on first to move the first seat bracket 221 relative to the first stand 212, and simultaneously the second rod 232b rotates relative to the first rod 232a and the third rod 232c to gradually rotate the first back support bracket 231. Or the first bottom sliding mechanism 213 is switched on to move the first stand 212 relative to the first base bracket 211, and the first sliding eccentric rod mechanism 242 is switched on to gradually rotate the first headrest bracket 241. During the movements mentioned above, the first rod 232a, the second rod 232b and the third rod 232c are also rotated. Finally, the first seat bracket 221 and the first back support bracket 231 are coplanar, and are parallel to a bottom surface of the vehicle and in the flattened status, which is convenient in loading cargo or for use as a bed.

Figure 9:
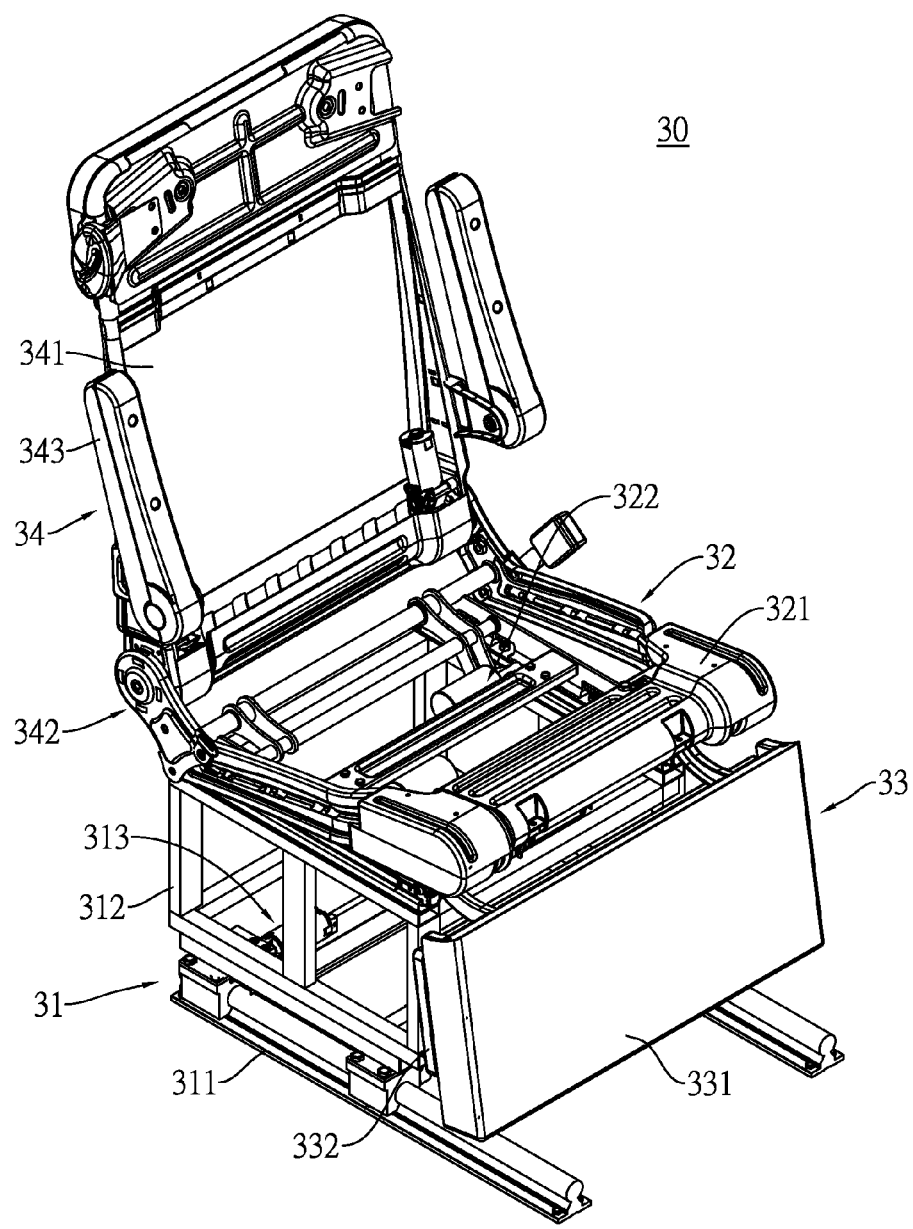
FIG. 9 is a perspective view of a second seat frame of the rotatable vehicle seat frame assembly in FIG. 1.
Figure 10:
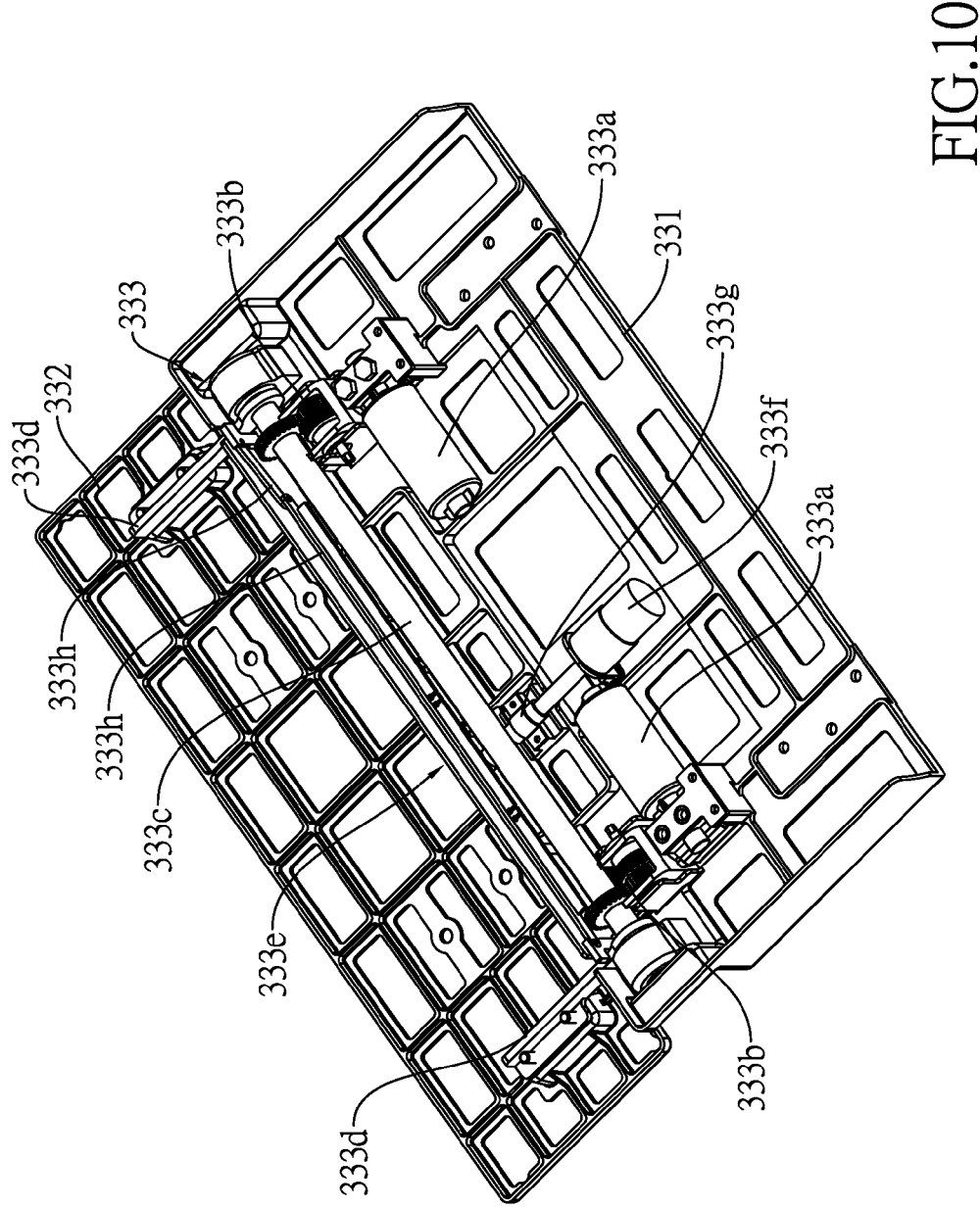
FIG. 10 is a perspective view of a leg rest assembly of the second seat frame of the rotatable vehicle seat frame assembly in FIG. 1.
Figure 11:
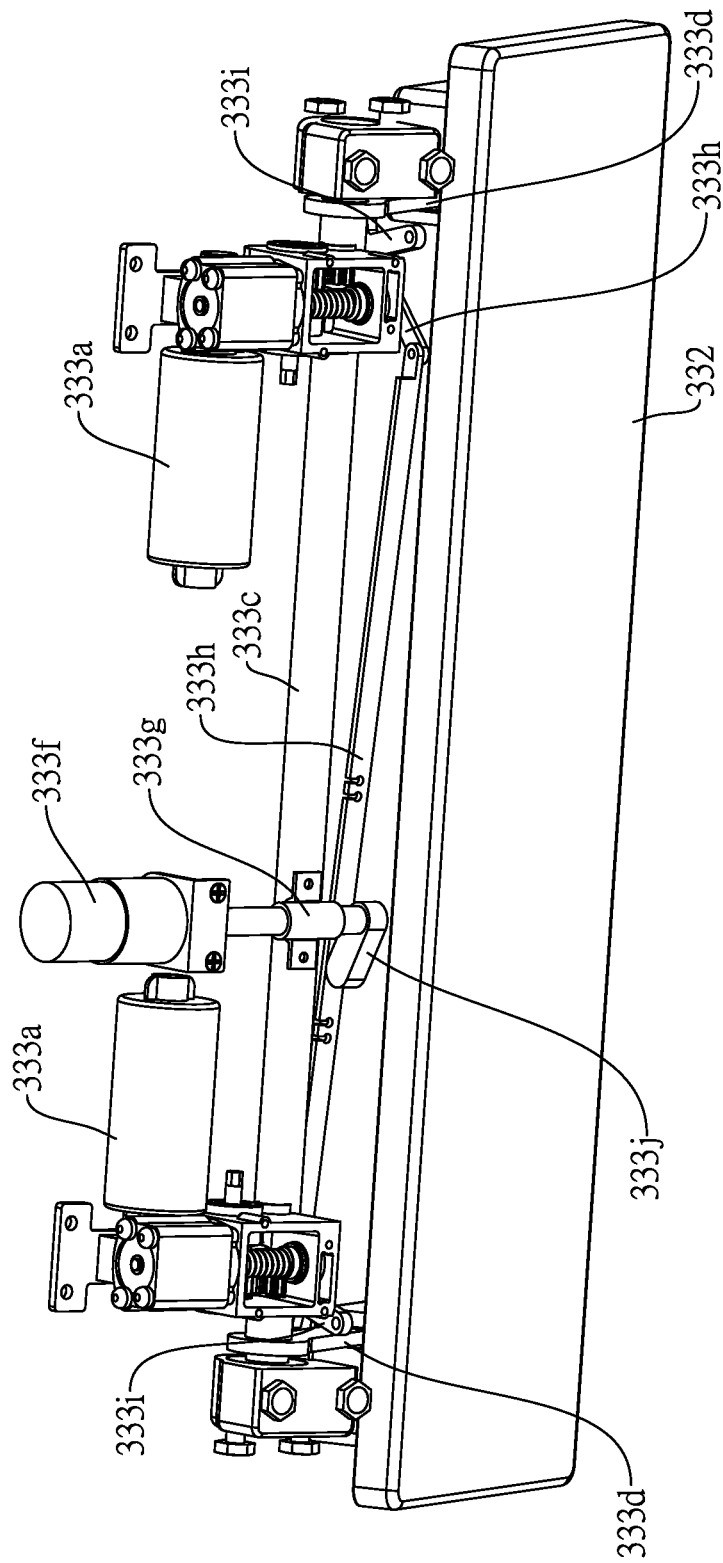
FIG. 11 is a partial perspective view of the leg rest assembly of the second seat frame of the rotatable vehicle seat frame assembly in FIG. 1.
Figure 12:
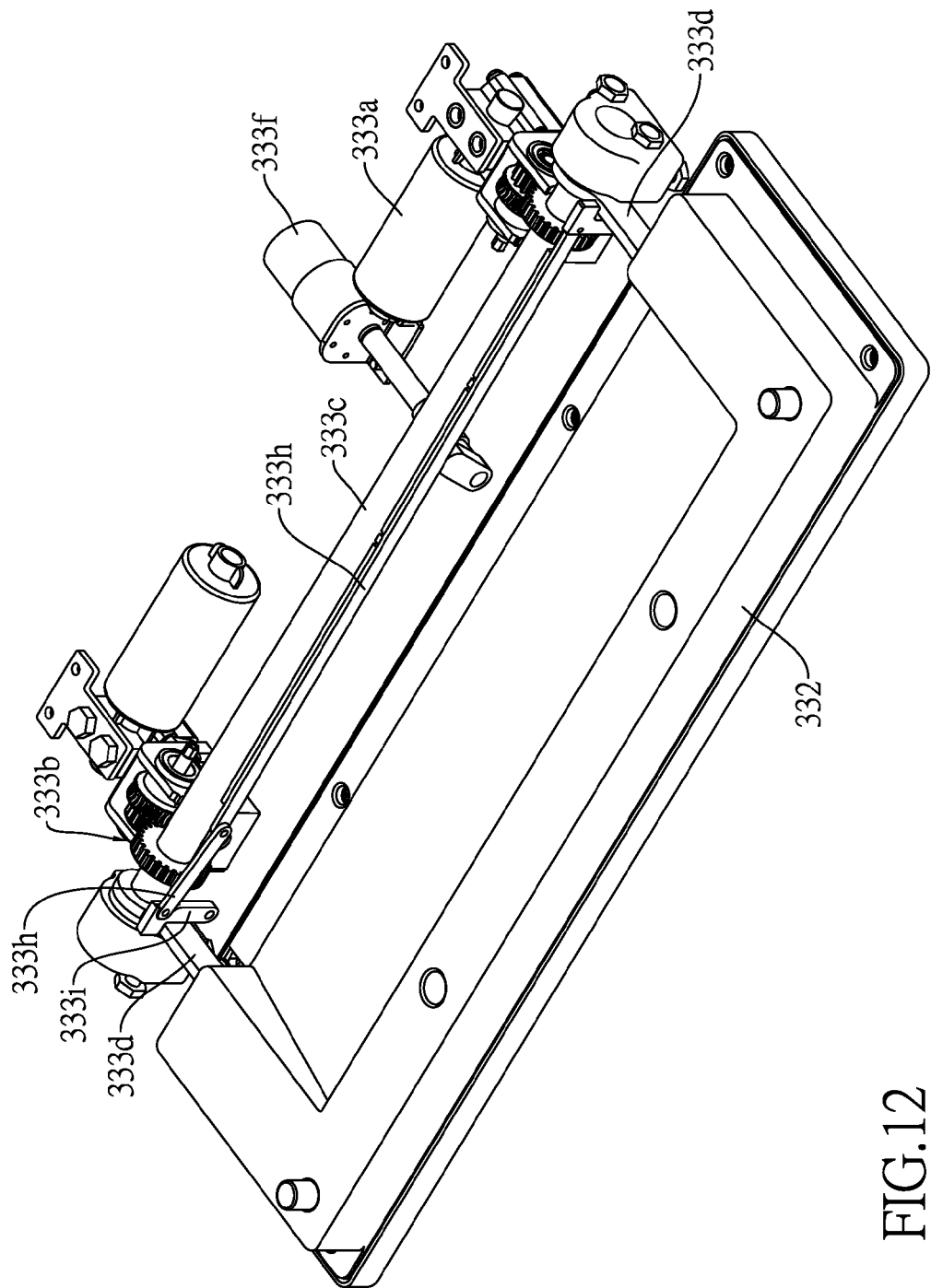
FIG. 12 is an operational partial perspective view of the leg rest assembly of the second seat frame of the rotatable vehicle seat frame assembly in FIG. 1.

With reference to FIGS. 1 and 9, the at least one second seat frame 30 is mounted on a top surface 11 of the main frame 10. Each second seat frame 30 has a second stand assembly 31, a second seat assembly 32, a leg rest assembly 33, and a second back support assembly 34.

The second stand assembly 31 has a second base bracket 311, a second stand 312, and a second bottom sliding mechanism 313. The second stand 312 is slidably mounted on a top surface of the second base bracket 311. The second bottom sliding mechanism 313 is mounted between the second stand 312 and the second base bracket 311 to make the second stand 312 slidable relative to the second base bracket 311. In a preferred embodiment, the second bottom sliding mechanism 313 comprises a motor, a gear assembly, a threaded rod, a nut, and multiple channels.

The second seat assembly 32 is slidably mounted on a top surface of the second stand assembly 32, and has a second seat bracket 321 and a second top sliding mechanism 322. The second top sliding mechanism 322 is mounted between the second seat bracket 321 and the second stand 312 to make the second seat bracket 321 slidable relative to the second stand 312. In a preferred embodiment, the second top sliding mechanism 322 comprises a motor, a gear assembly, a threaded rod, a nut, and multiple channels.

With reference to FIGS. 9 to 12, the leg rest assembly 33 is pivotally connected to a front side of the second seat bracket 321, and has a first leg rest 331, a second leg rest 332 and a rotating assembly 333. The first leg rest 331 is pivotally connected to the front side of the second seat bracket 321. The second leg rest 332 is pivotally connected to a front side of the first leg rest 331. The rotating assembly 333 is mounted between the first leg rest 331 and the second leg rest 332 to make the second leg rest 332 rotatable relative to the first leg rest 331. In a preferred embodiment, the rotating assembly 333 has at least one first motor 333a, at least one gear assembly 333b, a pintle 333c and at least one connecting arm 333d. The at least one first motor 333a is mounted on a bottom surface of the first leg rest 331. Each gear assembly 333b is connected to an actuating shaft of the corresponding first motor 333a, and is actuated by said first motor 333a. Each connecting arm 333d has a first end and a second end. The first end of the connecting arm 333d is connected securely to the pintle 333c. The second end of the connecting arm 333d is connected securely to a bottom surface of the second leg rest 332. In a preferred embodiment, the rotating assembly 333 has two first motors 333a, two gear assemblies 333b, two connecting arms 333d, and a stabilizing assembly 333e. The pintle 333c of the rotating assembly 333 is connected between the gear assemblies 333b. The stabilizing assembly 333e has a second motor 333f, a sway rod 333g, two stops 333i and two pivot rods 333h. The second motor 333f is mounted on the bottom surface of the first leg rest 331. The sway rod 333g is connected to an actuating shaft of the second motor 333f, is actuated by the second motor 333f, and has an eccentric protrusion 333j formed on an end of the sway rod 333g. The stops 333i respectively abut the connecting arms 333d. The pivot rods 333h are pivotally connected to each other, and are respectively and pivotally connected to the stops 333i. A periphery of one of the pivot rods 333h abuts a periphery of the eccentric protrusion 333j. The first motor 333a of the rotating assembly 333 is switched on to rotate the connecting arms 333d via the gear assembly 333b, and thus the second leg rest 332 is rotated relative to the first leg rest 331. When the second leg rest 332 is rotated to be aligned with the first leg rest 331, the rotation of the rotating assembly 333 is finished. At this time, the second motor 333f is switched on to rotate the eccentric protrusion 333j via the sway rod 333g, and thus the eccentric protrusion 333j abuts the pivot rods 333h, thereby making the pivot rods 333h actuate the stops 333i to press the connecting arms 333d. Accordingly, the connecting arms 333d are stabilized to prevent the connecting arms 333d from being rotated by the shake caused by the moving vehicle, as well as prevent the second leg rest 332 from rotating.

With reference to FIG. 9, the second back support assembly 34 is pivotally connected to the second seat assembly 32, and has a second back support bracket 341, at least one second angle-adjusting mechanism 342, and two armrests 343. The at least one second angle-adjusting mechanism 342 is mounted between the second back support bracket 341 and the second seat bracket 321 to make the second back support bracket 341 rotatable relative to the second seat bracket 321. The armrests 343 are respectively and pivotally connected to two sides of the second back support bracket 341. In a preferred embodiment, each second angle-adjusting mechanism 342 comprises a motor and a gear assembly.

Figure 13:
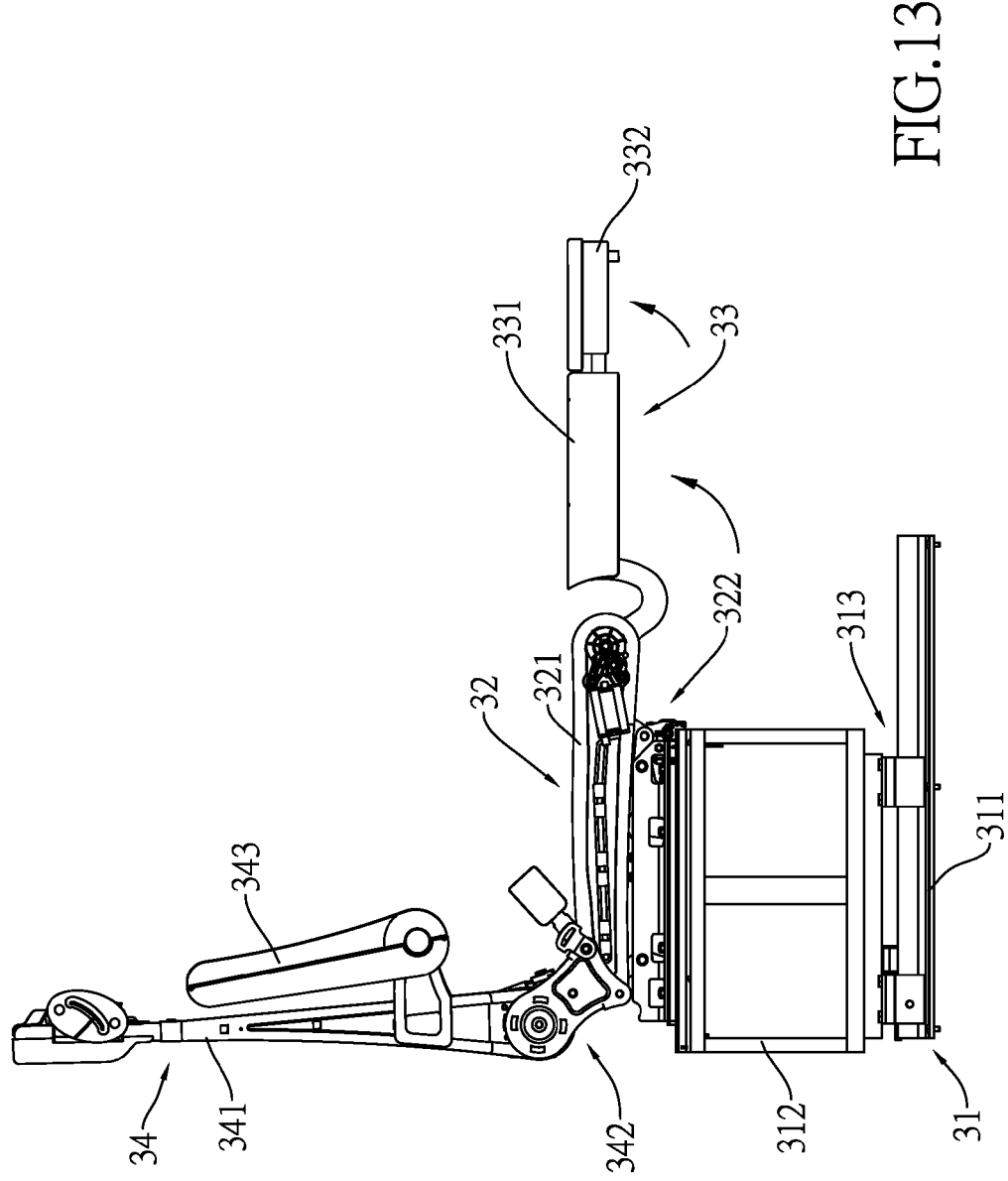
FIG. 13 is an operational side view of the second seat frame of the rotatable vehicle seat frame assembly in FIG. 1.
Figure 14:
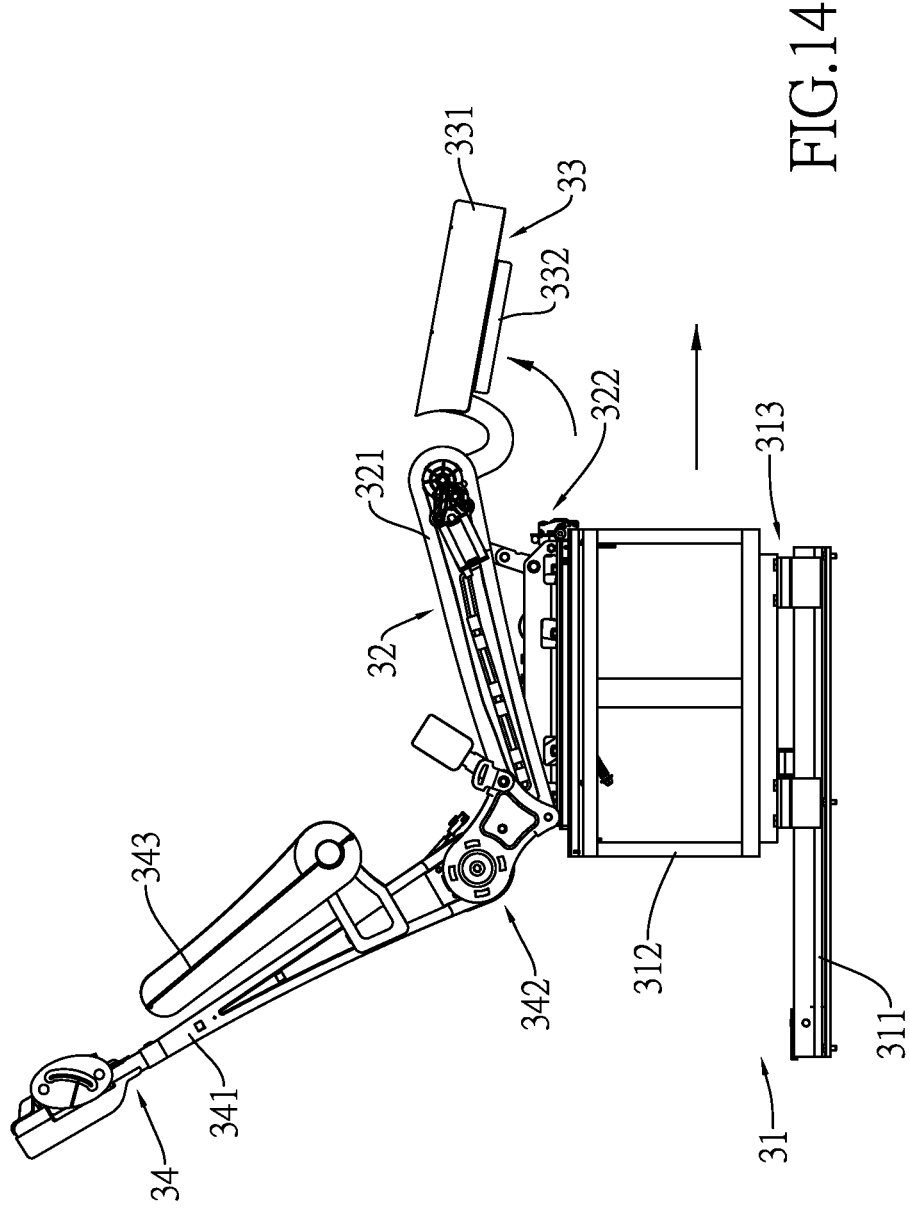
FIG. 14 is another operational side view of the second seat frame of the rotatable vehicle seat frame assembly in FIG. 1.
Figure 15:
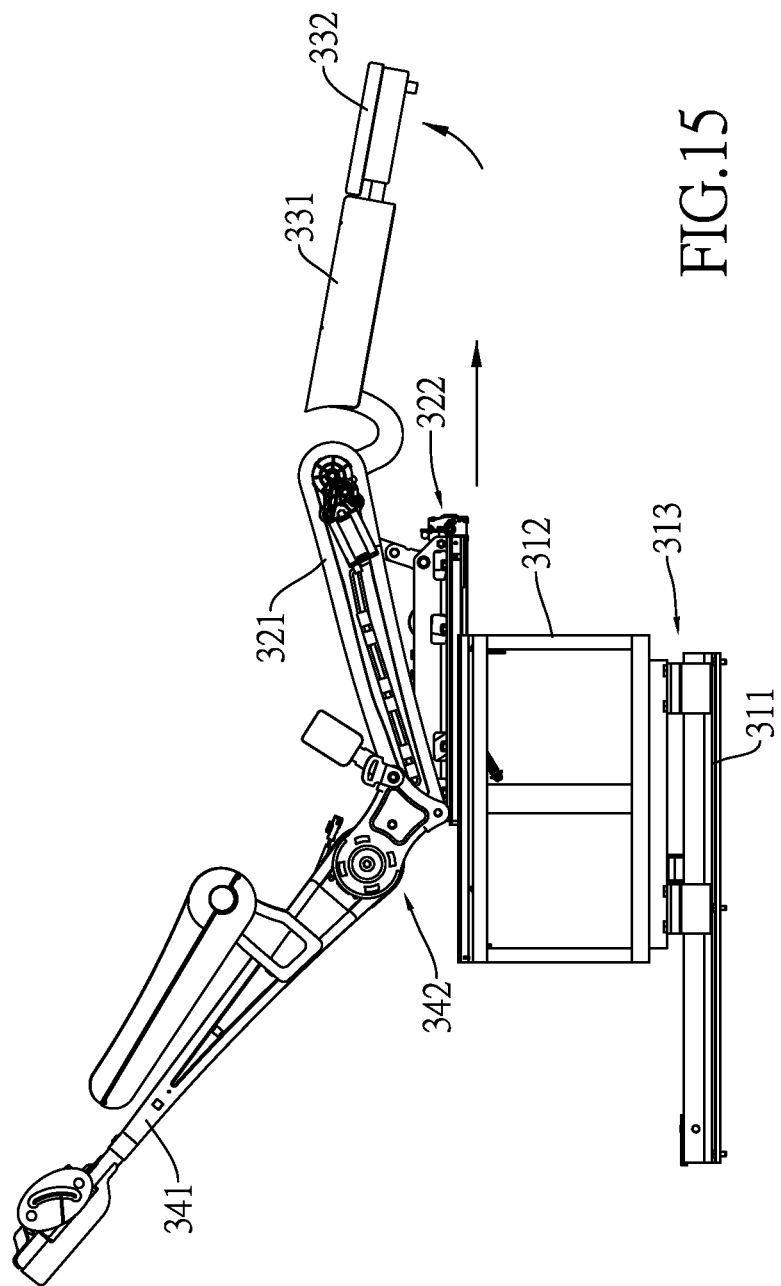
FIG. 15 is still another operational side view of the second seat frame of the rotatable vehicle seat frame assembly in FIG. 1.
Figure 16:
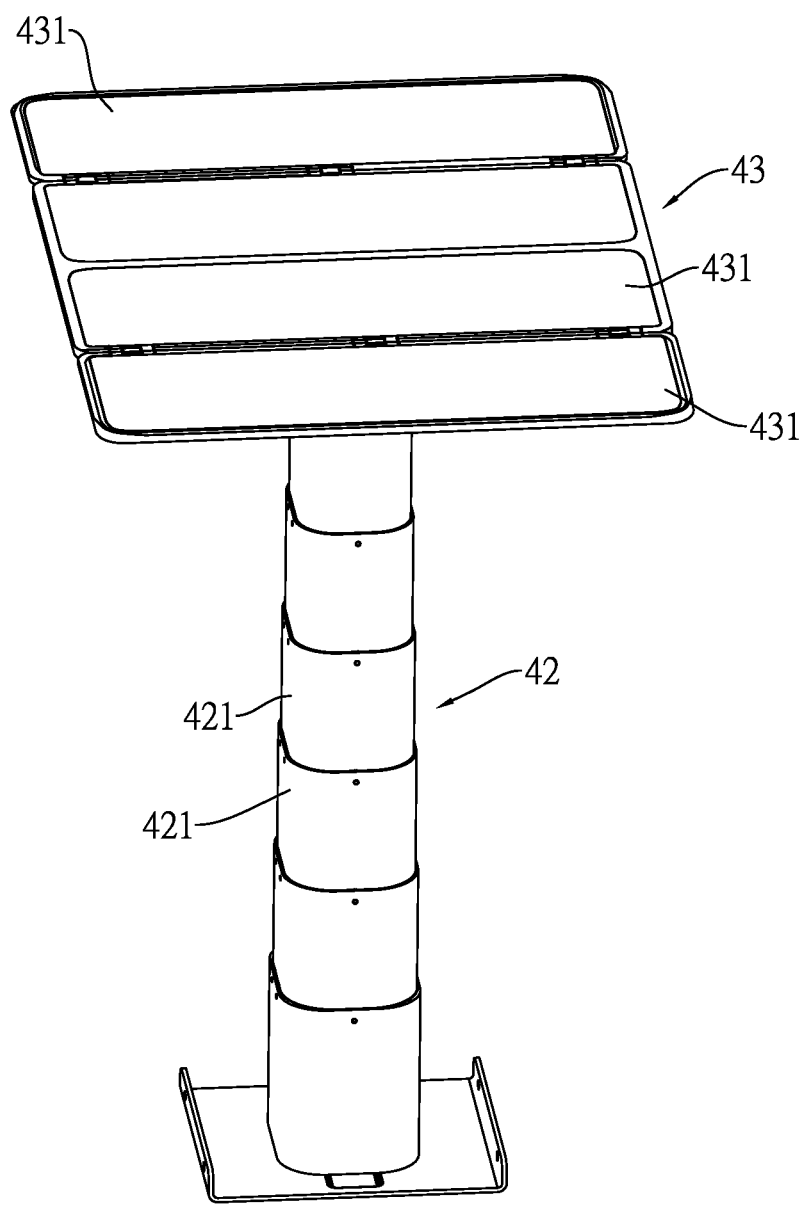
FIG. 16 is a perspective view of an elevatable desk of the rotatable vehicle seat frame assembly in FIG. 1.
Figure 17:
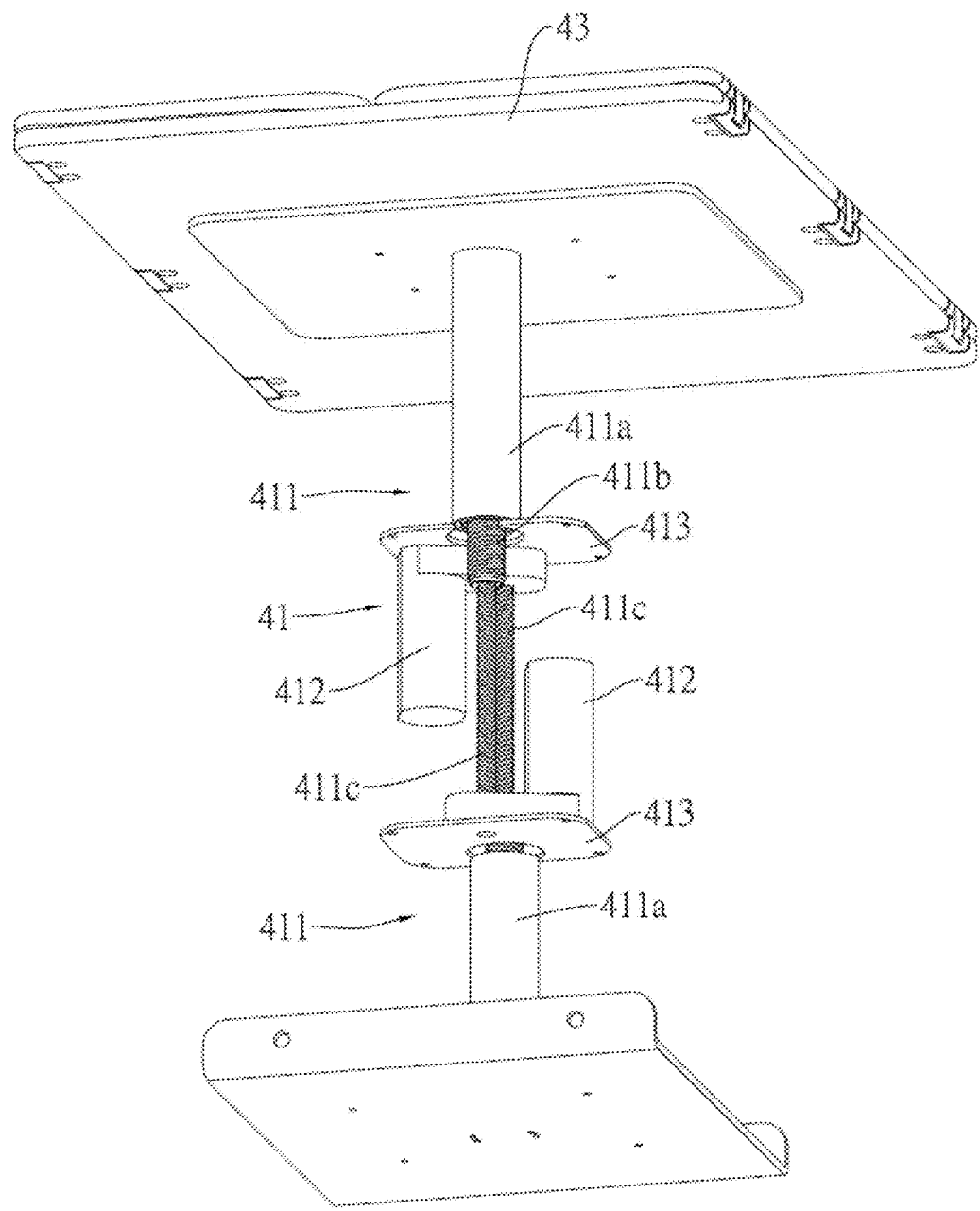
FIG. 17 is a partial perspective view of the elevatable desk of the rotatable vehicle seat frame assembly in FIG. 1.
Figure 18:
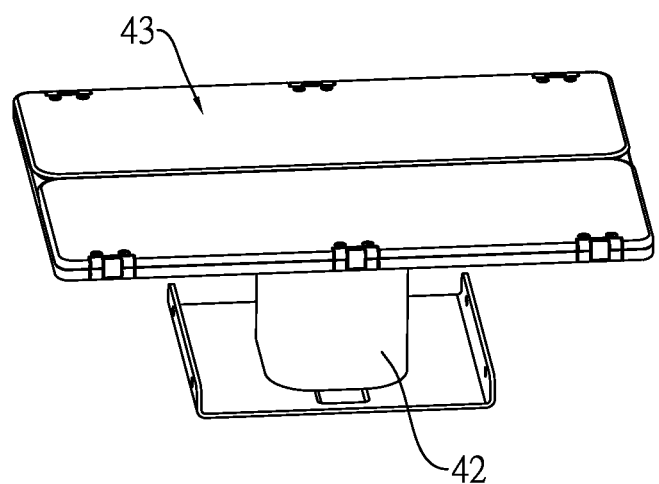
FIG. 18 is an operational perspective view of an elevatable desk of the rotatable vehicle seat frame assembly in FIG. 1.
Figure 19:
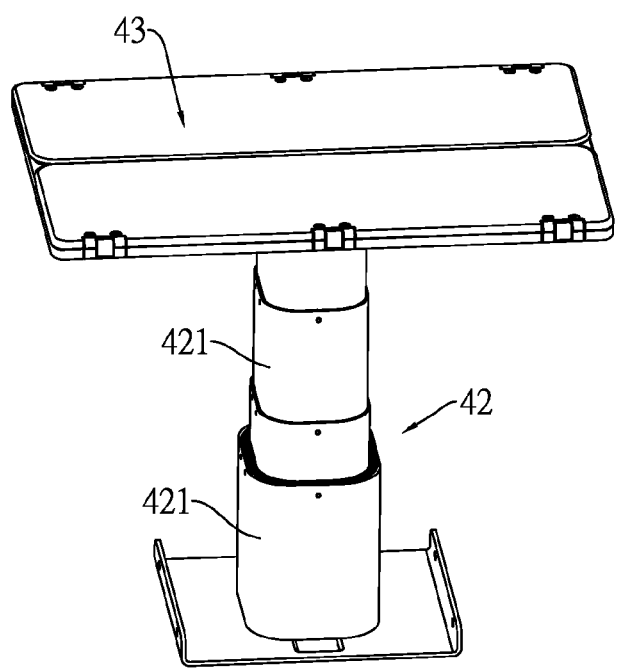
FIG. 19 is another operational perspective view of the elevatable desk of the rotatable vehicle seat frame assembly in FIG. 1.
Figure 20:
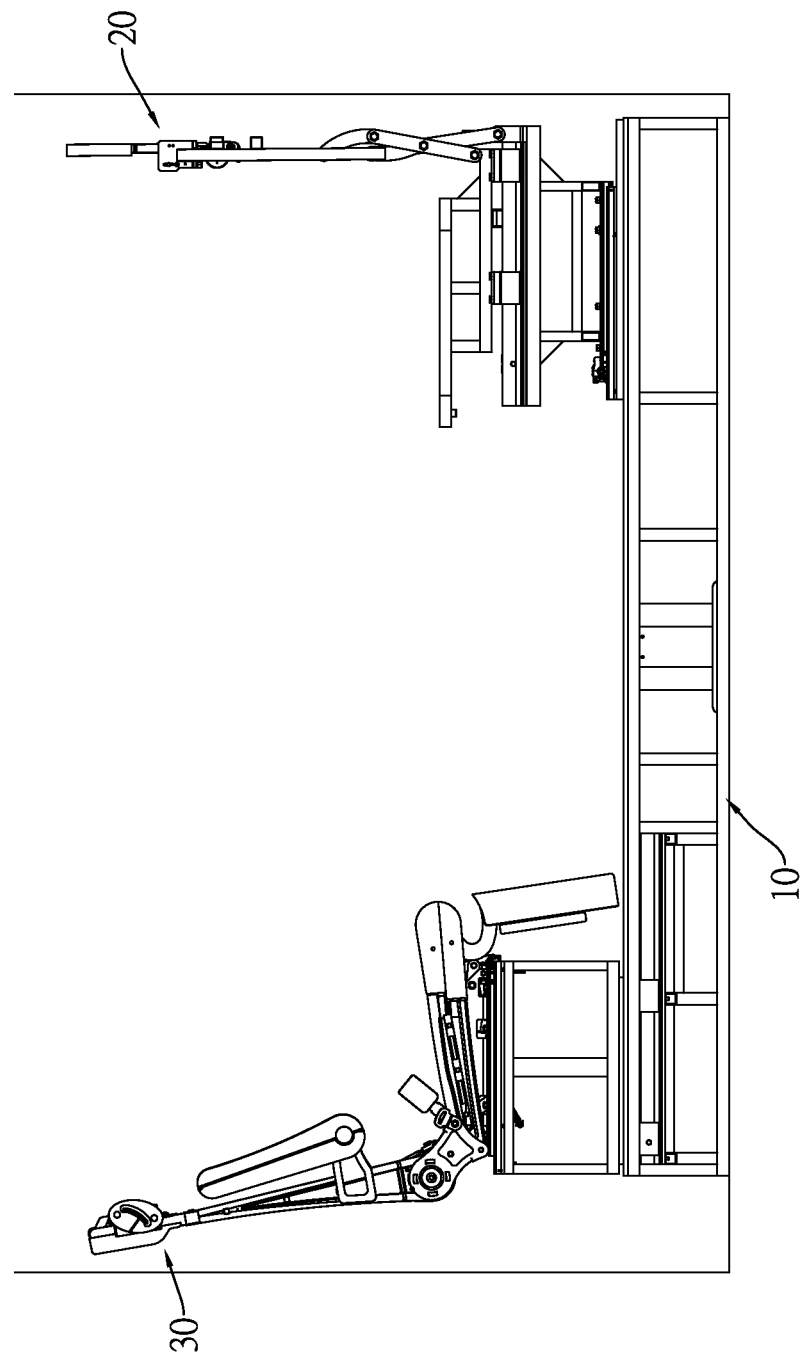
FIG. 20 is a side view of the rotatable vehicle seat frame assembly in FIG. 1.
Figure 21:
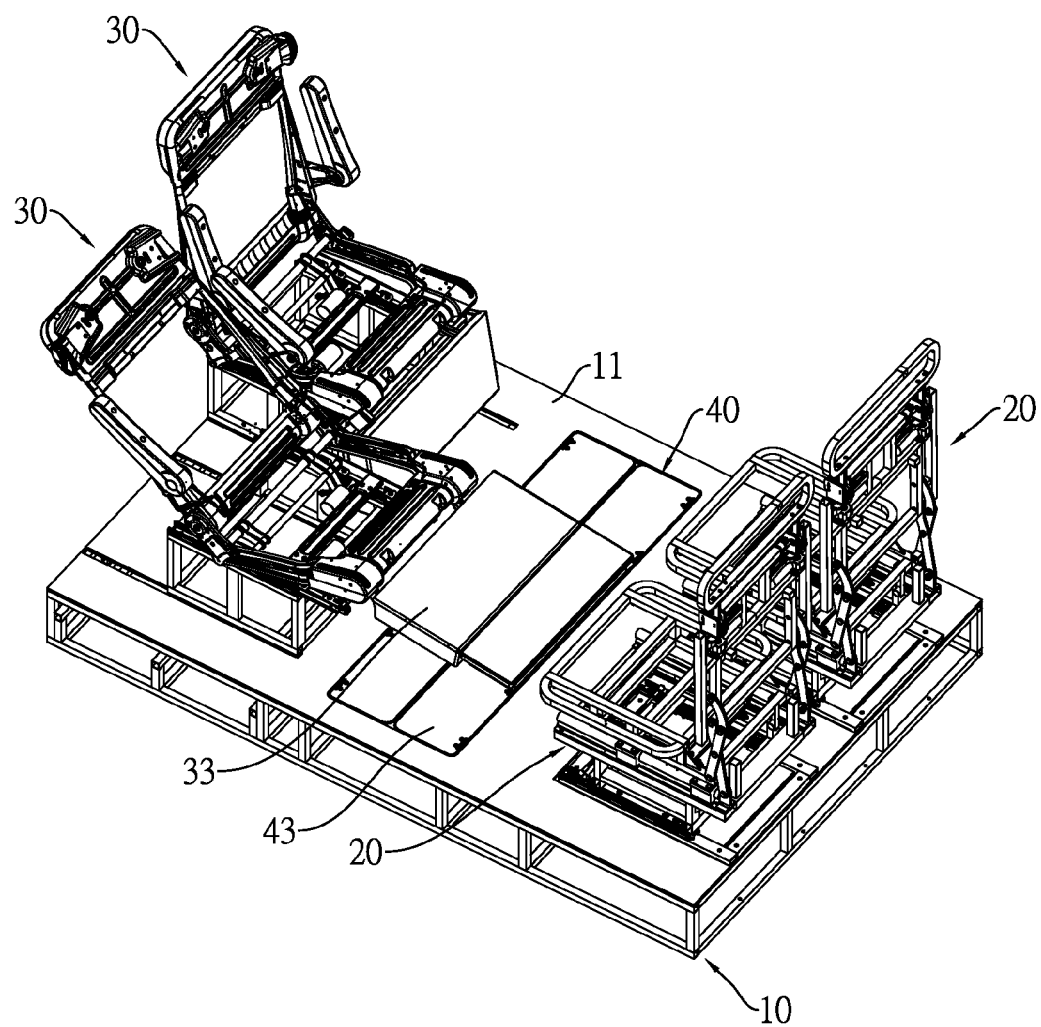
FIG. 21 is a first operational perspective view of the rotatable vehicle seat frame assembly in FIG. 1.
Figure 22:
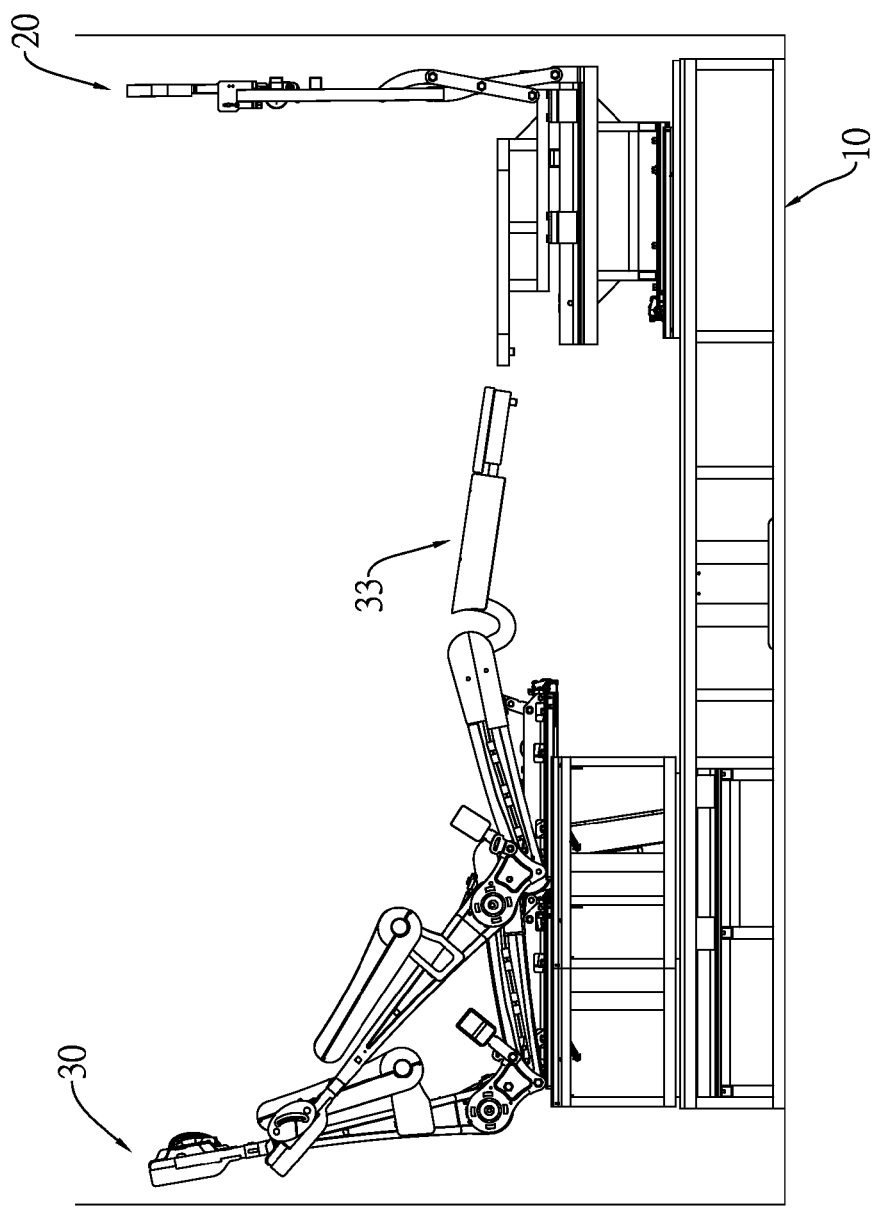
FIG. 22 is a first operational side view of the rotatable vehicle seat frame assembly in FIG. 1.

With reference to FIGS. 13 to 15, a user may simply operate the second bottom sliding mechanism 313, the second top sliding mechanism 322, the leg rest assembly 33 or the second angle-adjusting mechanism 342, depending on usage demand to adjust the second seat frame 30 to a desired angle and position. With reference to FIG. 13, the first leg rest 331 is rotated to be aligned with the second seat bracket 321, and the second leg rest 332 is rotated to be aligned with the first leg rest 331, such that the second seat bracket 321, the first leg rest 331 and the second leg rest 332 are connected in sequence to be coplanar. Accordingly, the second seat frame 30 may be connected to other seat frames to form a bed. With reference to FIGS. 14 and 15, the second bottom sliding mechanism 313 is switched on to move the second stand 312 relative to the second base bracket 311, the second angle-adjusting mechanism 342 is switched on to rotate the second back support bracket 341 relative to the second seat bracket 321, and the first leg rest 331 is rotated to be lifted. Then the second top sliding mechanism 322 is switched on to make the second seat bracket 321 slide relative to the second stand 312, thereby providing the second back support bracket 341 with adequate space for backward rotation. Afterwards, the second leg rest 332 is rotated to be aligned with the first leg rest 331, which provides the user with sufficient space to comfortably lie down.

With reference to FIGS. 1, 16 to 19, the at least one elevatable desk 40 is retractably mounted in the main frame 10. Each elevatable desk 40 has a retractable rod 42, an actuating device 41, and a foldable desk panel 43. The retractable rod 42 is mounted in the main frame 10. The actuating device 41 is mounted in the retractable rod 42, and extends the retractable rod 41 out of the main frame 10 or retracts the retractable rod 41 into the main frame 10. The foldable desk panel 43 is mounted securely in an end of the retractable rod 42. In a preferred embodiment, the actuating device 41 has two threaded rod assemblies 411, two third motor assemblies 412, two mounting boards 413 and an outer frame not shown in the drawings. The threaded rod assemblies 411 are respectively connected securely to the main frame 10 and the foldable desk panel 43. Each threaded rod assembly 411 has a first threaded rod 411a, a second threaded rod 411b, and a third threaded rod 411c. The first threaded rods 411a of the threaded rod assemblies 411 are respectively connected securely to the main frame 10 and a bottom of the foldable desk panel 43. The second threaded rod 411b is mounted in and screwed with the first threaded rod 411a. The third threaded rod 411c is mounted in and screwed with the second threaded rod 411b. The third motor assemblies 412 respectively rotate the third threaded rods 411c of the threaded rod assemblies 411. The mounting boards 413 are respectively mounted on the third motor assemblies 412. The outer frame is mounted around the mounting boards 413, the third motor assemblies 412 and the third threaded rods 411c of the threaded rod assemblies 411, and is connected securely to the mounting boards 413 to keep the mounting boards 413 disposed with a stationary interval. When the third motor assemblies 412 are switched on, the third threaded rods 411c are rotated and moved relative to the second threaded rods 411b, and then the third threaded rods 411c and the second threaded rods 411b together are rotated and moved relative to the first threaded rods 411a. When the threaded rod assembly 411 connected to the main frame 10 is extended, the mounting boards 413 and the outer frame are moved upward, which further moves upward the threaded rod assembly 411 connected to the foldable desk panel 43. When the threaded rod assembly 411 connected to the foldable desk panel 43 is extended, the foldable desk panel 43 is moved upward. As a result, the third motor assemblies 412 and the threaded rod assemblies 411 can adjust the height of the foldable desk panel 43. In a preferred embodiment, the foldable desk panel 43 has three panel bodies 431. One of the panel bodies 431 is disposed in the middle, and the other two panel bodies 431 are respectively and pivotally connected to two sides of the panel body 431 that is disposed in the middle. The retractable rod 42 has multiple sleeves 421 sleeved around one another in sequence from the sleeve 421 of a bigger outer diameter to another sleeve 421 of a smaller outer diameter.

With reference to FIG. 1, the rotatable vehicle seat frame assembly may comprise at least one first seat frame 20, at least one second seat frame 30, and at least one elevatable desk 40. The amounts and the positions of said elements may be adjusted depending on usage demand. In a preferred embodiment, the rotatable vehicle seat frame assembly comprises two first seat frames 20, two second seat frames 30 and two elevatable desks 40. The first seat frames 20 are disposed side by side, the second seat frames 30 are disposed side by side, and the first seat frames 20 and the second seat frames 30 are disposed opposite to each other. The elevatable desks 40 are disposed between the first seat frames 20 and the second seat frames 30. Each first seat frame 20 and each second seat frame 30 may be adjusted alone to facilitate convenience. With reference to FIGS. 1, 20 to 22, the elevatable desk 40 may be fully retracted into the main frame 10, and the foldable desk panel 43 is aligned with the top surface 11 of the main frame 10, such that the user can walk or stand on the elevatable desk 40. Each user can individually adjust the angle and the position of his/her first or second seat frame 20, 30, depending on usage demand.

Figure 23:
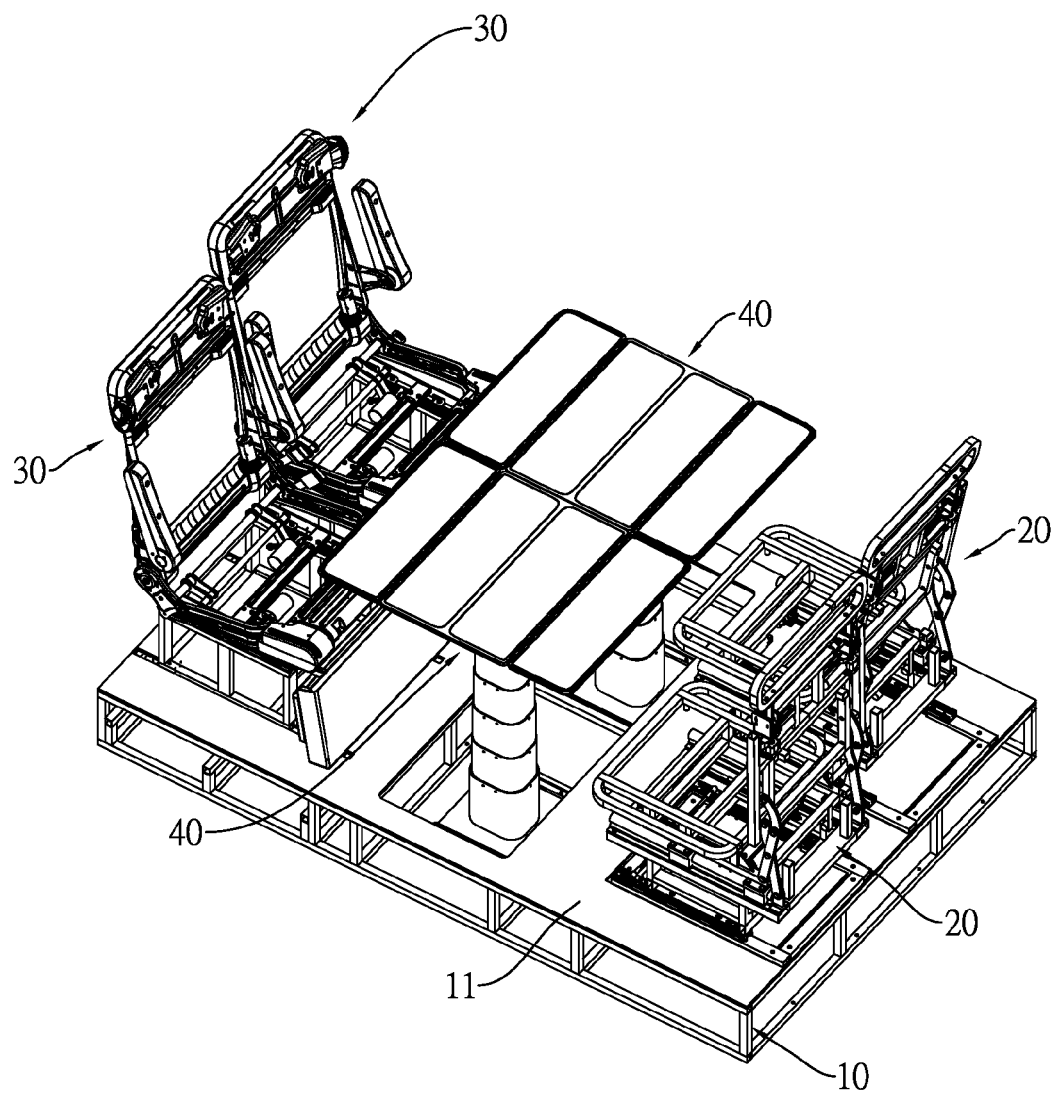
FIG. 23 is a second operational perspective view of the rotatable vehicle seat frame assembly in FIG. 1.
Figure 24:
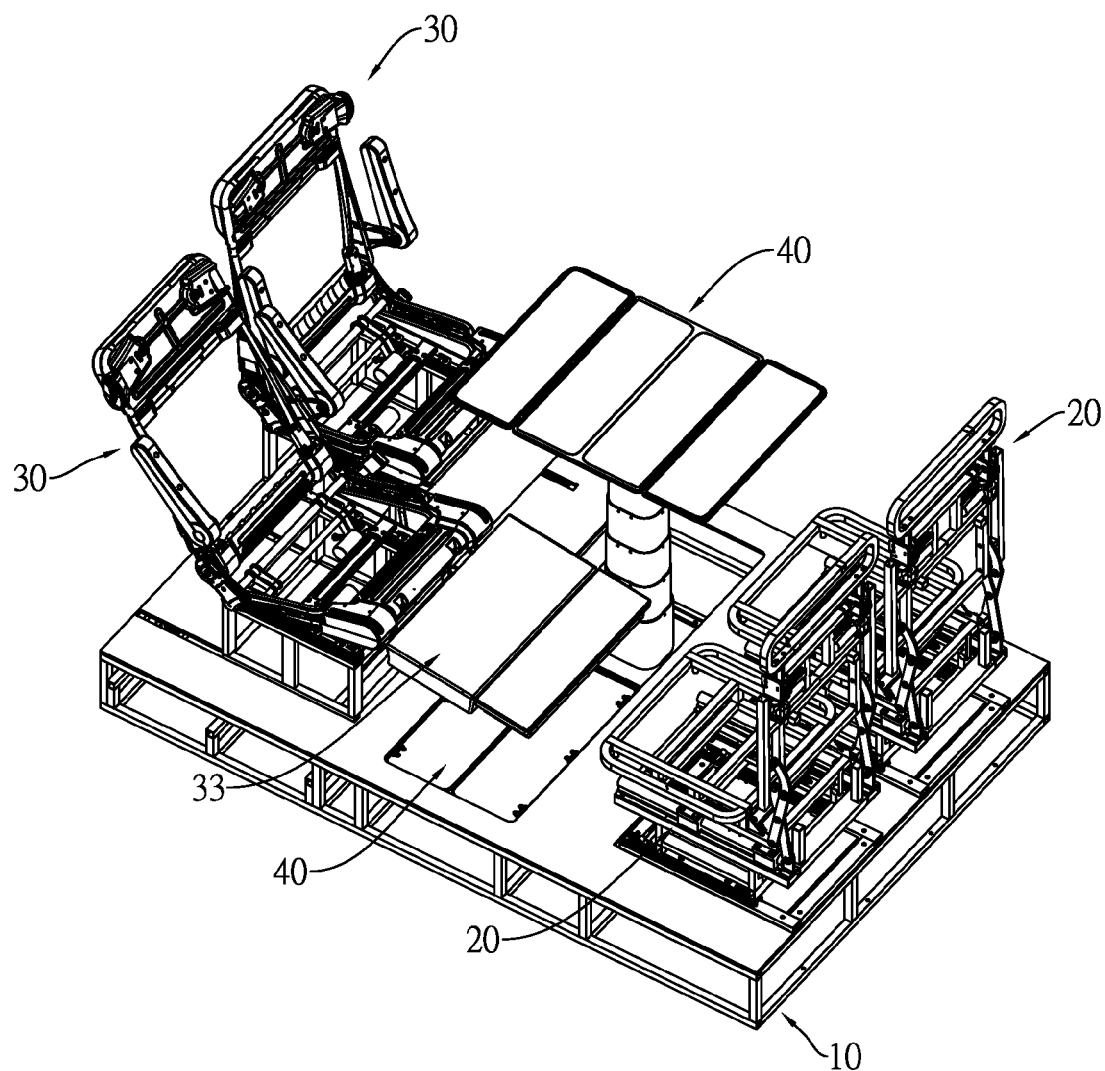
FIG. 24 is a third operational perspective view of the rotatable vehicle seat frame assembly in FIG. 1.
Figure 25:
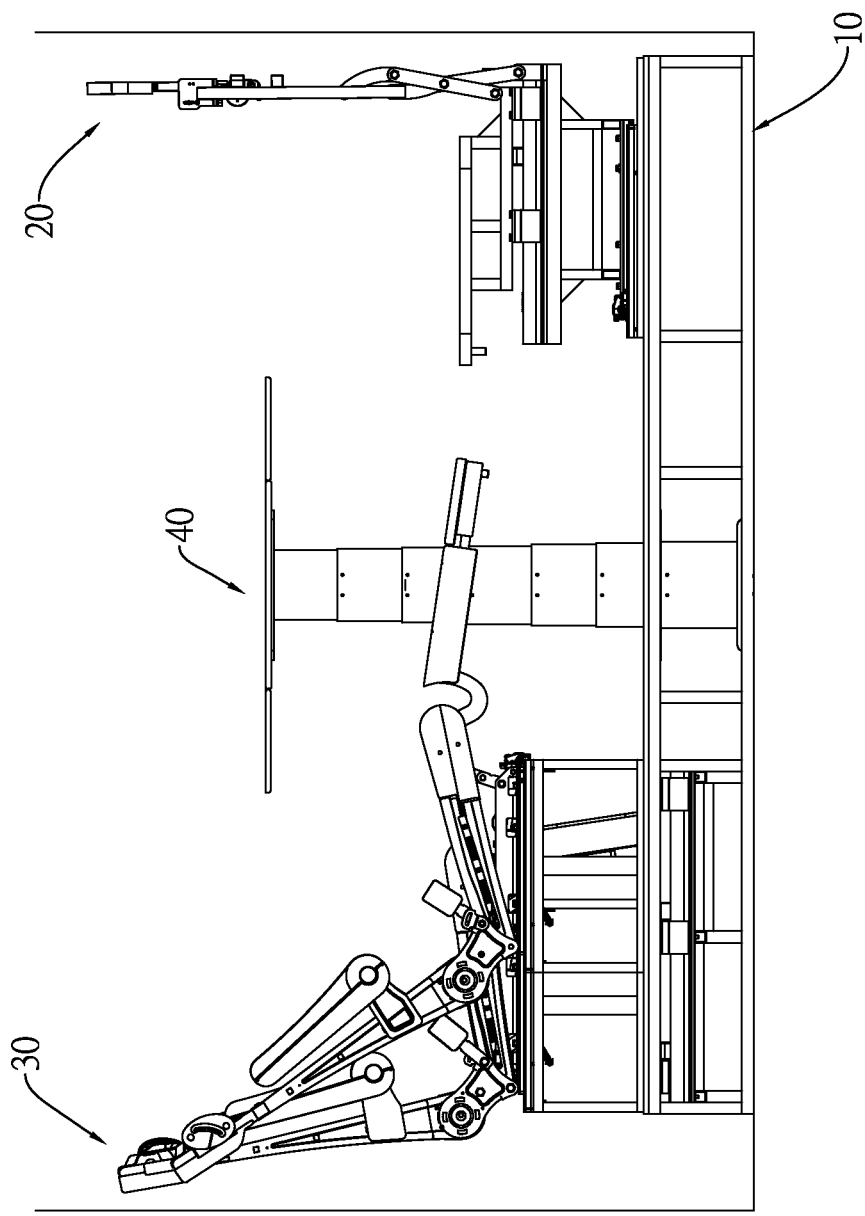
FIG. 25 is a third operational side view of the rotatable vehicle seat frame assembly in FIG. 1.
Figure 26:
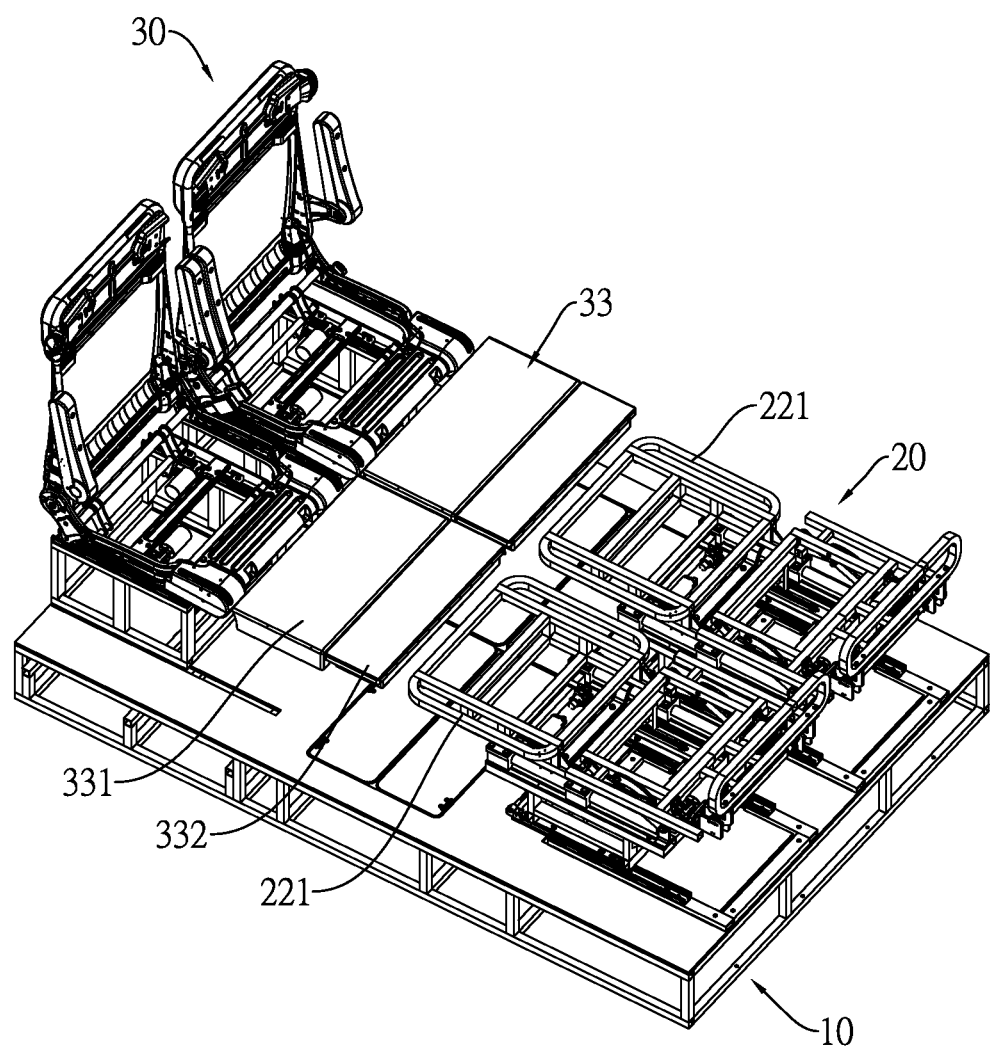
FIG. 26 is a fourth operational perspective view of the rotatable vehicle seat frame assembly in FIG. 1.
Figure 27:
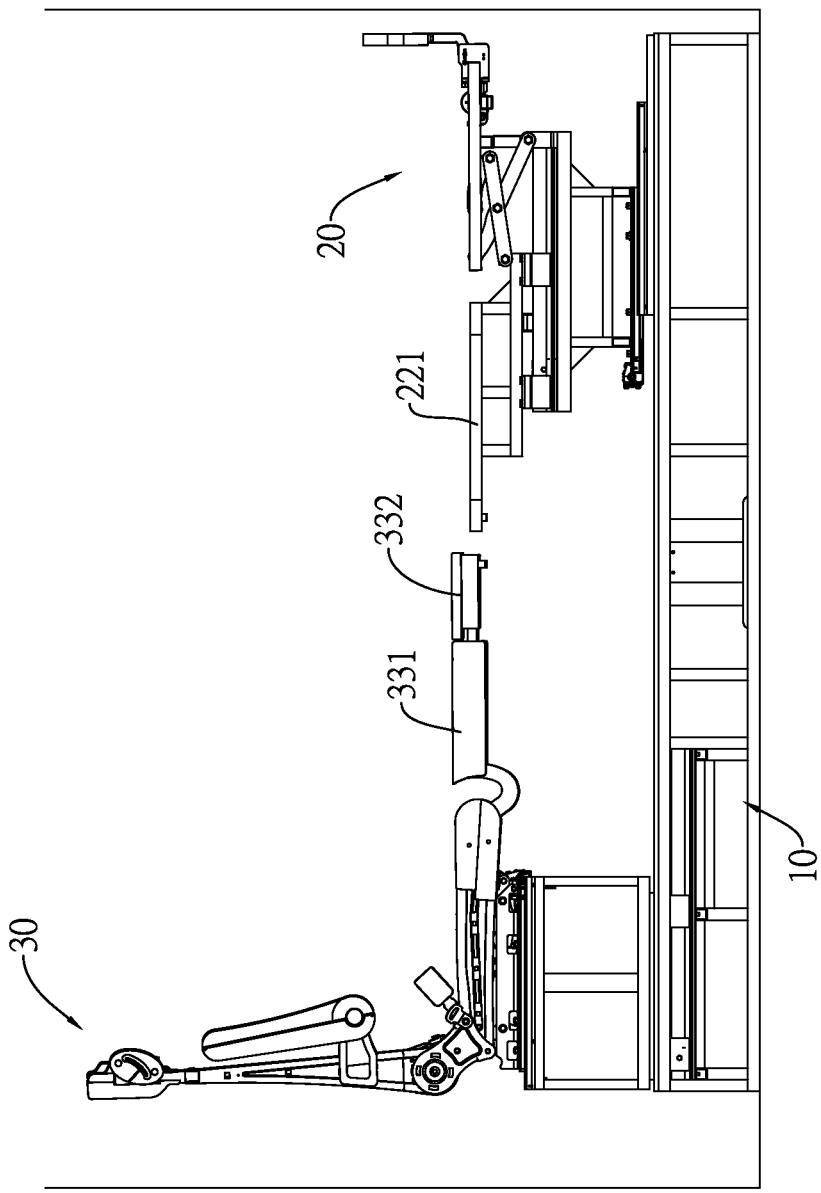
FIG. 27 is a fourth operational side view of the rotatable vehicle seat frame assembly in FIG. 1.
Figure 28:
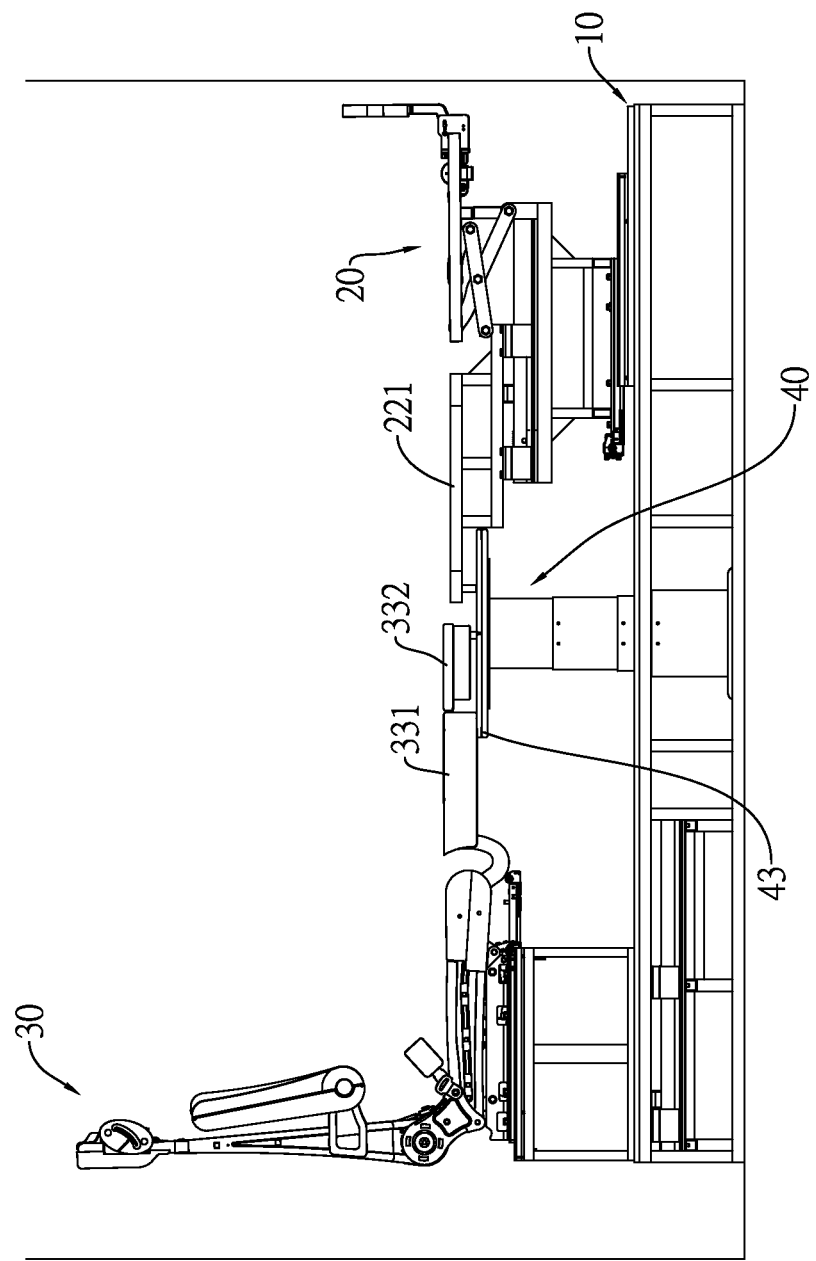
FIG. 28 is a fifth operational side view of the rotatable vehicle seat frame assembly in FIG. 1.

With reference to FIGS. 23 to 25, the elevatable desks 40 may be elevated all together or each individually when needed for part of or all the users who are seated on the seat frame 20, 30. Each user can individually adjust the angle and the position of his/her first or second seat frame 20, 30, depending on usage demand. With reference to FIGS. 26 to 28, the first seat frames 20 and the second seat frame 30 may be rotated into the flattened status, and the first seat frame 20 and the second seat frame 30 disposed opposite to each other are connected to form a plane by the alignment and connecting of the first seat bracket 221 and the leg rest assembly 33, such that said first seat frame 20 and said second seat frame 30 can be used as a bed. The elevatable desk 40 is elevated to a height that makes the foldable desk panel 43 accurately abut the first seat bracket 221 and the leg rest assembly 33 to support the weight of the user lying down on the seat frames 20, 30, thereby reducing the shake of the first seat bracket 221 and the leg rest assembly 33, and distributing the force applied by the weight to prevent the seat frames 20, 30 from breaking.

To sum up, the bottom sliding mechanisms 213, 313, the top sliding mechanisms 222, 322, the angle-adjusting mechanisms 232, 342 and the leg rest assembly 33 enable the seat frames 20, 30 to be rotated into the flattened status in a limited inner space of a vehicle, and can hold the seat frames 20, 30 at any angle during the adjustment to facilitate convenience in use. With the cooperation of the main frame 10 and the elevatable desk 40, the rotatable vehicle seat frame assembly can be applied in bigger vehicles, and provides more varieties in use and operation.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A rotatable vehicle seat frame assembly, comprising:
a main frame;
at least one first seat frame mounted on a top surface of the main frame; each one of the at least one first seat frame having
a first stand assembly having
a first base bracket;
a first stand slidably mounted on a top surface of the first base bracket; and
a first bottom sliding mechanism mounted between the first stand and the first base bracket to make the first stand slidable relative to the first base bracket;
a first seat assembly slidably mounted on a top surface of the first stand assembly, and having
a first seat bracket; and
a first top sliding mechanism mounted between the first seat bracket and the first stand to make the first seat bracket slidable relative to the first stand; and
a first back support assembly pivotally connected to the first seat assembly, and having
a first back support bracket; and
at least one first angle-adjusting mechanism mounted between the first back support bracket and the first seat bracket to make the first back support bracket rotatable relative to the first seat bracket;

at least one second seat frame mounted on the top surface of the main frame; each one of the at least one second seat frame having
  a second stand assembly having
    a second base bracket;
    a second stand slidably mounted on a top surface of the second base bracket; and
    a second bottom sliding mechanism mounted between the second stand and the second base bracket to make the second stand slidable relative to the second base bracket;
  a second seat assembly slidably mounted on a top surface of the second stand assembly, and having
    a second seat bracket; and
    a second top sliding mechanism mounted between the second seat bracket and the second stand to make the second seat bracket slidable relative to the second stand;
  a second back support assembly pivotally connected to the second seat assembly, and having
    a second back support bracket; and
    at least one second angle-adjusting mechanism mounted between the second back support bracket and the second seat bracket to make the second back support bracket rotatable relative to the second seat bracket; and
  a leg rest assembly pivotally connected to a front side of the second seat bracket, and having
    a first leg rest pivotally connected to the front side of the second seat bracket;
    a second leg rest pivotally connected to a front side of the first leg rest; and
    a rotating assembly mounted between the first leg rest and the second leg rest to make the second leg rest rotatable relative to the first leg rest; and
  at least one elevatable desk retractably mounted in the main frame.

2. The rotatable vehicle seat frame assembly as claimed in claim 1, wherein
  a number of the at least one first seat frame is two; the two first seat frames are disposed side by side;
  a number of the at least one second seat frame is two; the two second seat frames are disposed side by side; the first seat frames and the second seat frames are disposed opposite to each other; and
  a number of the at least one elevatable desk is two; the elevatable desks are disposed between the first seat frames and the second seat frames.

3. The rotatable vehicle seat frame assembly as claimed in claim 1, wherein the rotating assembly of the leg rest assembly of each one of the at least one second seat frame has
  at least one first motor mounted on a bottom surface of the first leg rest;
  at least one gear assembly; each one of the at least one gear assembly connected to an actuating shaft of the corresponding first motor and actuated by said first motor;
  a pintle; and
  at least one connecting arm; each one of the at least one connecting arm having
    a first end connected securely to the pintle; and
    a second end connected securely to a bottom surface of the second leg rest.

4. The rotatable vehicle seat frame assembly as claimed in claim 3, wherein in the leg rest assembly,
  a number of the at least one first motor of the rotating assembly is two;
  a number of the at least one gear assembly of the rotating assembly is two;
  a number of the at least one connecting arm of the rotating assembly is two;
  the pintle of the rotating assembly is connected between the gear assemblies; and
  the rotating assembly further has
    a stabilizing assembly having
      a second motor mounted on the bottom surface of the first leg rest;
      a sway rod connected to an actuating shaft of the second motor, actuated by the second motor, and having
        an eccentric protrusion formed on an end of the sway rod;
      two stops respectively abutting the connecting arms; and
      two pivot rods pivotally connected to each other, and respectively and pivotally connected to the stops; a periphery of one of the pivot rods abutting a periphery of the eccentric protrusion.

5. The rotatable vehicle seat frame assembly as claimed in claim 3, wherein each one of the at least one first angle-adjusting mechanism has
  a first rod having
    a first end pivotally connected to the first stand;
    a second end pivotally connected to the first back support bracket; and
    a center segment;
  a second rod having
    a first end pivotally connected to the first seat bracket;
    a second end; and
    a center segment pivotally connected to the center segment of the first rod; and
  a third rod having
    a first end pivotally connected to the second end of the second rod; and
    a second end pivotally connected to the first back support bracket.

6. The rotatable vehicle seat frame assembly as claimed in claim 3, wherein each of the at least one first seat frame has
  a first headrest assembly pivotally connected to the first back support assembly, and having
    a first headrest bracket; and
    at least one first sliding eccentric rod mechanism mounted between the first headrest bracket and the first back support bracket to make the first headrest bracket rotatable relative to the first back support bracket.

7. The rotatable vehicle seat frame assembly as claimed in claim 3, wherein each one of the at least one elevatable desk has
  a retractable rod mounted in the main frame;
  an actuating device mounted in the retractable rod, and extending the retractable rod out of the main frame or retracting the retractable rod into the main frame; and
  a foldable desk panel mounted securely in an end of the retractable rod.

8. The rotatable vehicle seat frame assembly as claimed in claim 3, wherein each one of the at least one second seat frame has
  two armrests respectively and pivotally connected to two sides of the second back support bracket.

9. The rotatable vehicle seat frame assembly as claimed in claim 1, wherein each one of the at least one first angle-adjusting mechanism has
- a first rod having
  - a first end pivotally connected to the first stand;
  - a second end pivotally connected to the first back support bracket; and
  - a center segment;
- a second rod having
  - a first end pivotally connected to the first seat bracket;
  - a second end; and
  - a center segment pivotally connected to the center segment of the first rod; and
- a third rod having
  - a first end pivotally connected to the second end of the second rod; and
  - a second end pivotally connected to the first back support bracket.

10. The rotatable vehicle seat frame assembly as claimed in claim 1, wherein each of the at least one first seat frame has
- a first headrest assembly pivotally connected to the first back support assembly, and having
  - a first headrest bracket; and
  - at least one first sliding eccentric rod mechanism mounted between the first headrest bracket and the first back support bracket to make the first headrest bracket rotatable relative to the first back support bracket.

11. The rotatable vehicle seat frame assembly as claimed in claim 1, wherein each one of the at least one elevatable desk has
- a retractable rod mounted in the main frame;
- an actuating device mounted in the retractable rod, and extending the retractable rod out of the main frame or retracting the retractable rod into the main frame; and
- a foldable desk panel mounted securely in an end of the retractable rod.

12. The rotatable vehicle seat frame assembly as claimed in claim 11, wherein each one of the at least one elevatable desk has
- two threaded rod assemblies respectively connected securely to the main frame and the foldable desk panel; each threaded rod assembly having
  - a first threaded rod having inner threads; the first threaded rods of the threaded rod assemblies respectively connected securely to the main frame and the foldable desk panel;
  - a second threaded rod having inner threads and outer threads for mated screwing with corresponding inner threads of the first threaded rod;
  - a third threaded rod having outer threads for mated screwing with corresponding inner threads of the second threaded rod;
- two third motor assemblies rotating respective third threaded rods of the threaded rod assemblies to extend or retract the threaded rod assemblies; and
- two mounting boards mounted on respective third motor assemblies, and disposed with a stationary interval.

13. The rotatable vehicle seat frame assembly as claimed in claim 12, wherein the retractable rod has
multiple sleeves sleeved around one another in sequence of outer diameter sizes of the sleeves.

14. The rotatable vehicle seat frame assembly as claimed in claim 11, wherein the foldable desk panel has
three panel bodies; one of the panel bodies disposed in the middle, and the other two panel bodies respectively and pivotally connected to two sides of the panel body that is disposed in the middle.

15. The rotatable vehicle seat frame assembly as claimed in claim 1, wherein each one of the at least one second seat frame has
two armrests respectively and pivotally connected to two sides of the second back support bracket.

* * * * *